United States Patent [19]
Kojima et al.

[11] Patent Number: 5,751,935
[45] Date of Patent: May 12, 1998

[54] RADIO PAGING SYSTEM

[75] Inventors: Takafumi Kojima, Yokohama; Sotaro Hiroshima, Chigasaki; Toshiro Suzuki, Tama; Yasuo Kogure; Akio Yasuda, both of Yokohama, all of Japan

[73] Assignee: Hitachi, Ltd., Tokyo, Japan

[21] Appl. No.: 565,135

[22] Filed: Dec. 1, 1995

[30] Foreign Application Priority Data

Dec. 2, 1994 [JP] Japan .................................. 6-299244

[51] Int. Cl.$^6$ .................................................. G08C 17/00
[52] U.S. Cl. ................................. 395/182.04; 455/95
[58] Field of Search ................. 364/514 R; 340/825.44, 340/825.52, 311.1; 455/95, 132, 39, 38.1, 33.1; 370/276, 278, 389, 395, 449; 348/17, 16; 371/30, 35, 37.1, 41, 48; 395/182.04, 185.01, 185.05

[56] References Cited

U.S. PATENT DOCUMENTS

| | | | |
|---|---|---|---|
| 4,151,510 | 4/1979 | Howell et al. | 371/37.7 |
| 4,803,487 | 2/1989 | Willard et al. | 340/825.44 |
| 4,956,641 | 9/1990 | Matai et al. | 340/825.44 |
| 5,051,999 | 9/1991 | Erhart et al. | 371/41 |
| 5,162,790 | 11/1992 | Jasinski | 340/825.44 |
| 5,349,588 | 9/1994 | Schellinger | 371/37.1 |
| 5,537,100 | 7/1996 | Hallberg | 340/825.21 |

FOREIGN PATENT DOCUMENTS 0235371 9/1987 Germany.

*Primary Examiner*—James P. Trammell
*Assistant Examiner*—Thomas Peeso
*Attorney, Agent, or Firm*—Kenyon & Kenyon

[57] ABSTRACT

The detection of any transmission error having developed between a central station and a transmitting station, and the start of a counterplan to the transmission error are realized by a simple construction. The central station transmits messages to which error correcting codes for correcting the transmission errors of the respective messages are affixed, to receivers via the transmitting stations through radio communications. Each of the receivers corrects the transmission error which has developed in relation to the message received through the radio communications, by the use of the error correcting code affixed to the particular message. On the other hand, each of the transmitting stations for relaying the messages detects whether or not the transmission error has developed in relation to the message received from the central station, by the use of the error correcting code affixed to the particular message, and it executes predetermined failure counterplan processing in a case where frequency in the transmission error detection has exceeded a predetermined frequency value.

7 Claims, 23 Drawing Sheets

FIG. 3

| | 1 2 3 4 5 6 7 ... 21 | 22 ... 31 | 32 |
|---|---|---|---|
| | INFORMATION BITS | CHECK BITS | EVEN PARITY |
| WORD #0 | i i i i i i i i i i i i i i i | pppppppppp | p |
| WORD #1 | i i i i i i i i i i i i i i i | pppppppppp | p |
| WORD #2 | i i i i i i i i i i i i i i i | pppppppppp | p |
| WORD #3 | i i i i i i i i i i i i i i i | pppppppppp | p |
| WORD #4 | i i i i i i i i i i i i i i i | pppppppppp | p |
| ⋮ | ⋮ | ⋮ | ⋮ |
| WORD #n | i i i i i i i i i i i i i i i | pppppppppp | p |

FIG. 4

| | 1 2 3 4 5 6 7 ... 21 | 22 ... 31 | 32 |
|---|---|---|---|
| | INFORMATION BITS | CHECK BITS | EVEN PARITY |
| WORD #0a | i i i i i i i i i i i i i i i | pppppppppp | p |
| WORD #0b | i i i i i i i i i i i i i i i | pppppppppp | p |
| WORD #1a | i i i i i i i i i i i i i i i | pppppppppp | p |
| WORD #1b | i i i i i i i i i i i i i i i | pppppppppp | p |
| ⋮ | ⋮ | ⋮ | ⋮ |
| WORD #6a | i i i i i i i i i i i i i i i | pppppppppp | p |
| WORD #6b | i i i i i i i i i i i i i i i | pppppppppp | p |
| WORD #7a | i i i i i i i i i i i i i i i | pppppppppp | p |
| WORD #7b | i i i i i i i i i i i i i i i | pppppppppp | p |

FIG.5

| | 1 2 3 4 5 6 7 ········· 21 | 22 ········ 31 | 32 |
|---|---|---|---|
| | INFORMATION BITS | CHECK BITS | EVEN PARITY |
| WORD #0a | i i i i i i i i i i i i i i | pppppppppp | p |
| WORD #0b | i i i i i i i i i i i i i i | pppppppppp | p |
| WORD #0c | i i i i i i i i i i i i i i | pppppppppp | p |
| WORD #0d | i i i i i i i i i i i i i i | pppppppppp | p |
| WORD #1a | i i i i i i i i i i i i i i | pppppppppp | p |
| ⋮ | ⋮ | ⋮ | ⋮ |
| WORD #6d | i i i i i i i i i i i i i i | pppppppppp | p |
| WORD #7a | i i i i i i i i i i i i i i | pppppppppp | p |
| WORD #7b | i i i i i i i i i i i i i i | pppppppppp | p |
| WORD #7c | i i i i i i i i i i i i i i | pppppppppp | p |
| WORD #7d | i i i i i i i i i i i i i i | pppppppppp | p |

FIG.6

| BI | AF | VF | MF | IB |
|---|---|---|---|---|

FIG. 7

| FLAG | EXCHANGE FRAME LENGTH | CYCLE NO. | FRAME NO. | FREQUENCY CHANNEL | OTHER INFORMATION | MESSAGE INFORMATION | CRC | FLAG |

FIG. 15
LAYOUT
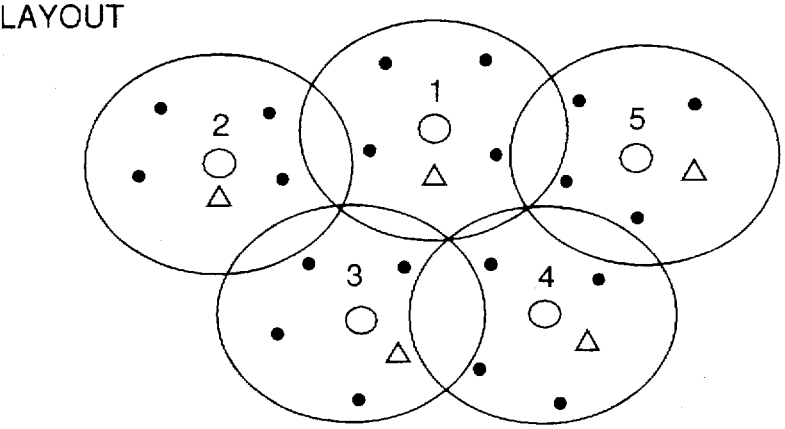
○ POSITION OF STANDARD STATION
△ POSITION OF STANDBY STANDARD STATION
● POSITION OF TRANSMITTING STATION
HIERARCHY
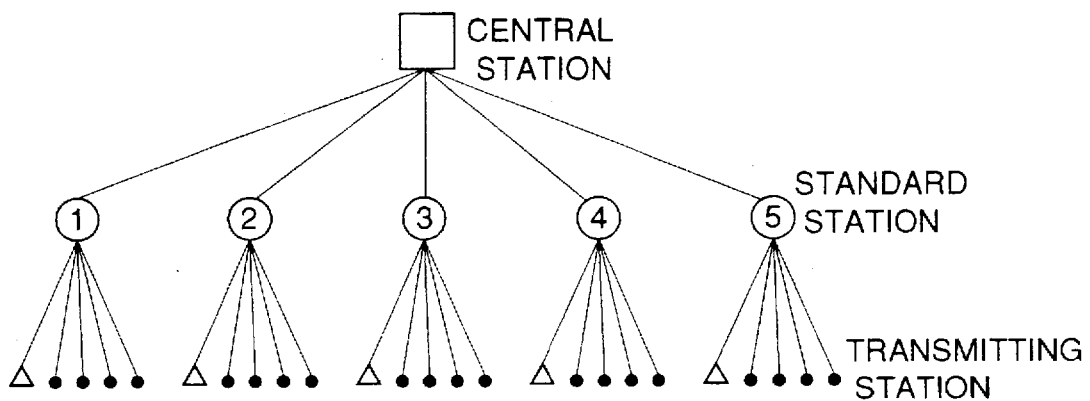

FIG.16
LAYOUT
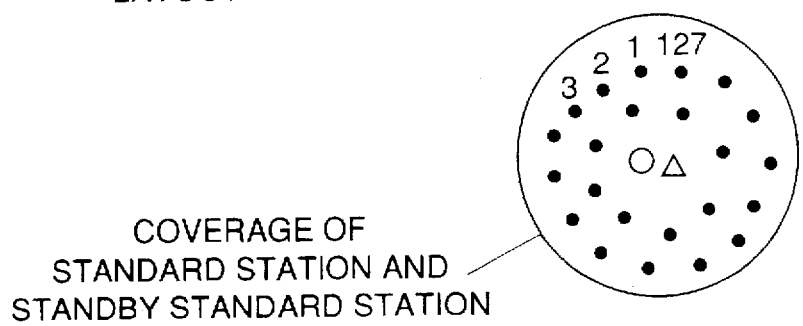
COVERAGE OF
STANDARD STATION AND
STANDBY STANDARD STATION
○ POSITION OF STANDARD STATION
△ POSITION OF STANDBY STANDARD STATION
● POSITION OF TRANSMITTING STATION
HIERARCHY
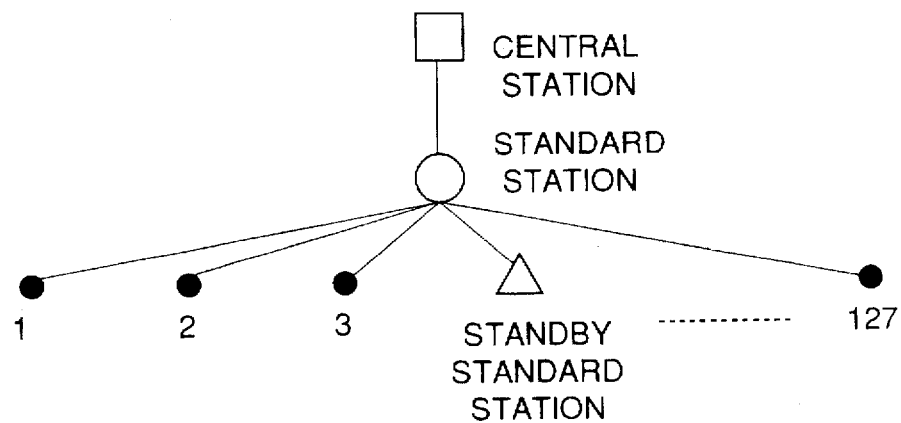

RADIO PAGING SYSTEM

BACKGROUND OF THE INVENTION

1. Field of the Invention

The present invention relates to a radio paging system in which messages are forward by telephone sets etc. to portable radio receivers utilizing a public network.

2. Description of Related Art

There exist a radio paging system wherein messages are sent from telephone sets etc. to portable radio receivers, e.g., pagers by utilizing a public network.

Such a radio paging system can be implemented by, for example, a construction shown in FIG. 25 of the accompanying drawings.

Referring to FIG. 25, the system has a central station 1, transmitting stations 2 and 3, receivers 4, a public network 5, and telephone sets (subscribers' terminals) 6.

A message originated toward any of the receivers 4 by the telephone set 6 is sent to the central station 1 through the public network 5. The central station 1 sends the message to all the transmitting stations 2 and 3. Then, the individual transmitting stations 2 and 3 radiocast the message. Each of the receivers 4 receives the message sent from the transmitting stations 2 and 3 whose radio waves can be received by the particular receiver 4. If the message is directed to the particular receiver 4, the content thereof is displayed on a display unit or the like included in this receiver.

According to the method wherein a call directed to a certain receiver is transmitted from the transmitting stations 2 and 3 as stated above, the management of the locations of the individual receivers 4, etc. need not be performed in the network architecture (consisting of the public network 5, base station 1, and transmitting stations 2 and 3). Moreover, each receiver 4 need not be furnished with a transmission function for identifying its location to the network architecture. Accordingly, the radio paging system can be realized by a simple construction.

Meanwhile, according to such a method, each receiver 4 receives the radio waves transmitted from the plurality of transmitting stations 2 and 3. That is, the radio waves transmitted from the plurality of transmitting stations 2 and 3 interfere with one another in each receiver 4. For the purpose of permitting each receiver 4 to properly receive the message even in the presence of the interference, therefore, each of the transmitting stations 2 and 3 needs to be synchronized so as to transmit the identical content at substantially the same time.

In this regard, as a technique for synchronizing all the transmitting stations 2 and 3, an example to be explained below is considered.

First, one of the transmitting stations 2 and 3 is set as a standard station beforehand. It is assumed here that the transmitting station 3 is the standard station. Besides, the time delays of the radio transmissions from the standard station 3 to the respective transmitting stations 2 are measured beforehand. Further, information on the time of a timepiece included in the standard station 3 is sent by a radio transmission. Each transmitting station 2 sets its own timepiece by the timepiece of the standard station 3 on the basis of the sent time information and the delay time obtained beforehand.

On the other hand, the central station 1 affixes to each message, information for assigning the time at which the message is to be transmitted, whereupon it sends the resulting message to the transmitting stations 2 and 3. Each of the transmitting stations 2 and 3 sends the message at the assigned time in accordance with the timepiece of its own.

Meanwhile, in such a radio paging system, a single central station usually manage and control transmitting stations. Here, the content of the information managed by the central station is multifarious contains transmission errors developed during the transmission from the central station to the transmitting stations, a variety of status controls, and so forth. Therefore, the burden of the managements and controls of the individual transmitting stations to the central station is not light. In addition, such a radio paging system is a simple system wherein receivers perform only receptions and do not perform transmissions. It is therefore meritorious in that the whole system can be simplified in construction. Accordingly, unless the managements and controls of the individual transmitting stations in the central station can be performed by a comparatively simple technique, a simple construct of the radio system will be hindered.

On the other hand, the transfer rates of information items received by the receivers and the information lengths of information frames received by the receivers are not identical, the information items have different rates and the information frames have different lengths. In contrast to the above merit based on the receivers, this poses the problem that the construction of the system becomes complicated. Moreover in such a radio paging system, it is common practice to multiplex a plurality of messages in time division and to transmit and process the resulting multiple signal. This, a complicated mechanism is required for multiplexing the frames of different final transmission speeds and different information lengths, in order to synchronize one with the other.

SUMMARY OF THE INVENTION

The present invention provides a radio paging system in which individual transmitting stations can be managed and controlled by a simpler technique of lower load in a central station.

The present invention also provides a radio paging system in which frames of different final transmission speeds and different information lengths can be processed by a simpler mechanism.

The present invention also provides, for example, a radio paging system, comprising a plurality of receivers which receive messages through radio communications, a plurality of transmitting stations which transmit the messages to the receivers through the radio communications and a central station which is connected to a communications network, and which allocates the messages received from the communications network, to the plurality of transmitting stations The central station includes means for obtaining error correcting codes which serve to correct transmission errors of the messages received from the communications network, and means for allocating messages to which the error correcting codes obtained are affixed, to the respective transmitting stations.

Each receiver includes means for correcting the transmission error which has developed in relation to the message received through the radio communications, by the use of the error correcting code affixed to the message.

Each of the transmitting stations includes means for detecting if the transmission error has developed in relation to the message received from the central station, by the use of the error correcting code affixed to the message, and failure counterplan means for executing predetermined failure counterplan processing in a case where frequency in the transmission error detection has exceeded a predetermined frequency value.

With the radio paging system according to the present invention as stated above, each of the transmitting stations detects whether or not the transmission error has developed in relation to the message received from the central station, by the use of the error correcting code affixed to the particular message and serving to correct the error in the receiver, and it executes the predetermined failure counterplan processing in the case where the frequency in the transmission error detection has exceeded the predetermined frequency value.

Thus, the detection of the transmission error having developed between the central station and the transmitting station, and the execution of the counterplan processing to the transmission error can be realized by the simple construction in which any dedicated information for detecting the transmission error between the central station and the transmitting station is not exchanged between the central station and each transmitting station.

BRIEF DESCRIPTION OF THE DRAWINGS

FIG. 3 is a diagram showing the correspondence between the organizations and phases of words which are contained in each of blocks constituting the air frame, the block being transmitted at a transfer rate of 1600 (bps).

FIG. 4 is a diagram showing the correspondence between the organizations and phases of words which are contained in each of blocks constituting the air frame, the block being transmitted at a transfer rate of 3200 (bps).

FIG. 5 is a diagram showing the correspondence between the organizations and phases of words which are contained in each of blocks constituting the air frame, the block being transmitted at a transfer rate of 6400 (bps).

FIG. 6 is a diagram showing the format of a communication frame which is composed of the words of one phase contained in each of the blocks constituting the air frame.

FIG. 7 is a diagram showing the format of an exchange frame which is employed in the embodiment of the present invention.

FIG. 15 is a diagram showing the layout of standard stations and standby standard stations according to the embodiment of the present invention.

FIG. 16 is a diagram showing the layout of a standard station and a standby standard station according to the embodiment of the present invention.

DETAILED DESCRIPTION

Now, one embodiment of a radio paging system according to the present invention will be described.

Figure 1:
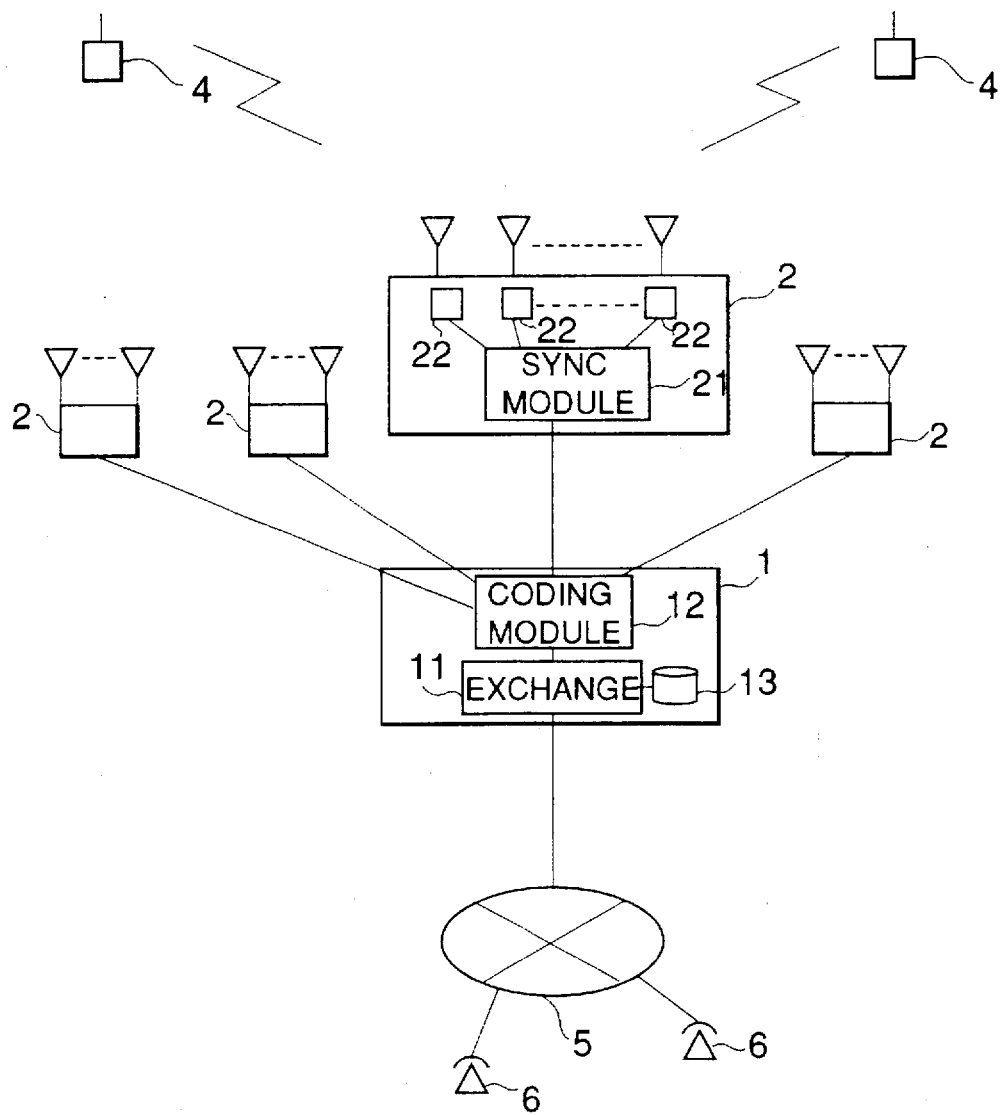
FIG. 1 is a schematic block diagram showing the construction of a radio paging system according to an embodiment of the present invention.

FIG. 1 illustrates the construction of the radio paging system in this embodiment.

Referring to the figure, the system comprises a central station 1, transmitting stations 2, receivers 4, a public network 5, and telephone sets 6.

The central station 1 and the individual transmitting stations 2 are connected by dedicated digital lines, public digital lines, analog lines (lines for modems), etc. In addition, each of the transmitting stations 2 and the individual receivers 4 are connected by a radio channel.

The radio channel includes a plurality of frequency channels, on each of which a plurality of radio circuits are realized. One of the receivers 4 receives a message sent from each transmitting station 2 by a specified one of the radio circuits.

In such a construction, a message originated from the telephone 6 toward any receiver 4 is sent to the central station 1 through the public network 5. The central station 1 sends the message to all the transmitting stations 2. Since the transmitting stations 2 are held synchronized, they broadcast the message accepted from the central station 1, at substantially the same time by the use of the radio circuit corresponding to the destination receiver 4. Each receiver 4 receives the message sent from the transmitting stations 2 whose radio waves can be received by the particular receiver 4. If the message is directed to the particular receiver 4, this receiver displays the content of the message on a display unit or the like included therein.

The details of the radio paging system according to this embodiment will be described below.

First, the format of air frames which are transmitted on the respective frequency channels from the transmitting station 2 will be explained.

Figure 2:
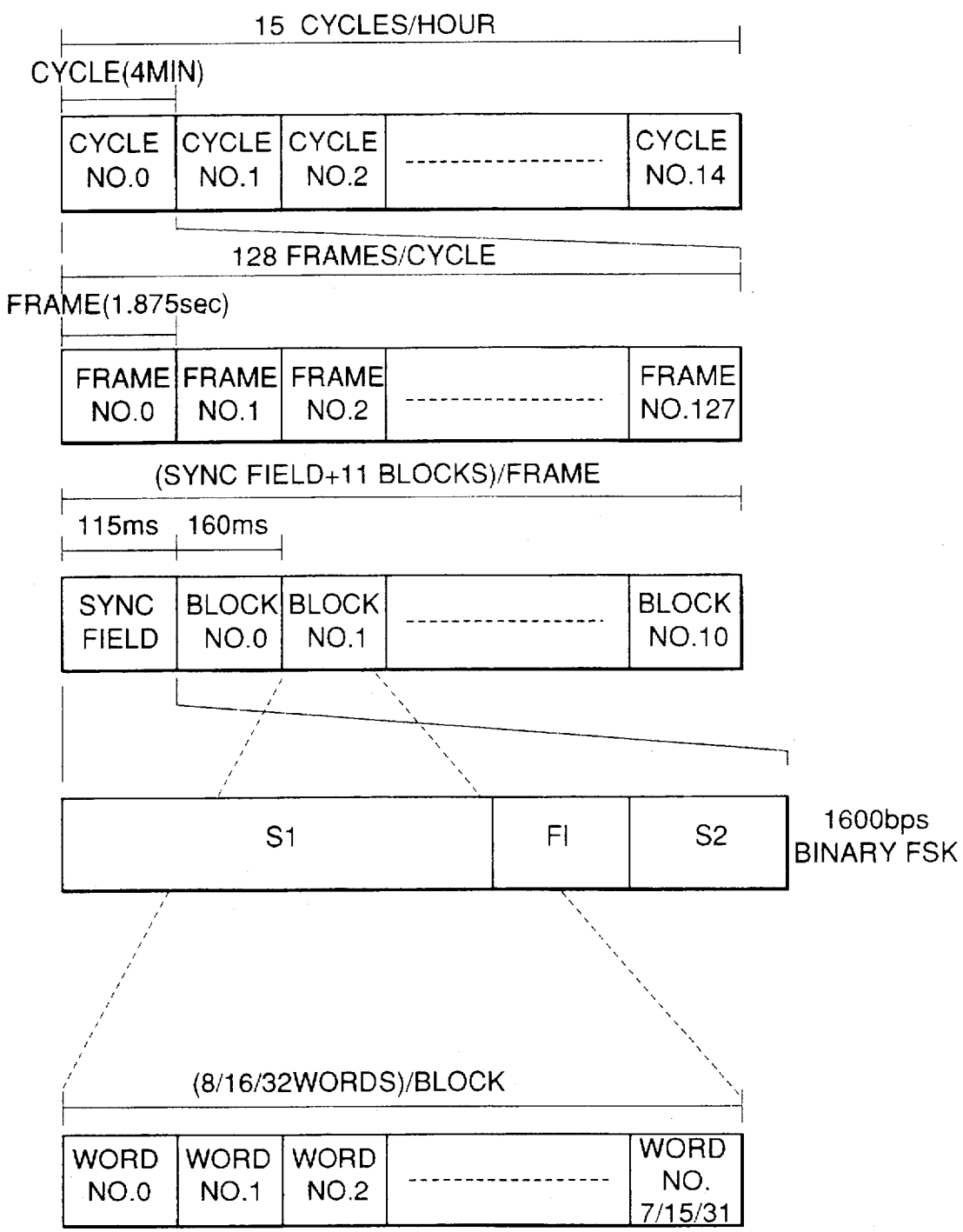
FIG. 2 is a diagram showing the format of an air frame which receivers receive in the radio paging system.

The transmitting stations 2 transmit the air frames shown in FIG. 2, toward the receivers 4 on each frequency channel.

As shown in FIG. 2, the transmitting stations 2 transmit the 128 air frames in each of 15 cycles obtained by dividing one hour by 4 minutes. Each of the air frames consists of one synchronization field and 11 blocks.

The synchronization field is composed of a synchronization part #1 (S1), frame information (FI) and a synchronization part #2 (S2). Excepting the synchronization part #1 (S1) and the frame information (FI), each of the air frames is transmitted at any of transfer rates of 1600 (bps), 3200 (bps) and 6400 (bps). On the other hand, the synchronization part #1 and the frame information are always transmitted at the transfer rate of 1600 (bps). The synchronization part #1 contains, not only a synchronizing pattern for the corresponding air frame, but also information items for designating the transfer rates of the synchronization part #2 (S2) and the corresponding blocks. Besides, the frame information contains information items on the No. of the cycle in which the pertinent air frame is transmitted (cycle No.), the No. of the pertinent air frame within the corresponding cycle (air frame No.), etc. The synchronization part #2 contains a synchronizing pattern for the pertinent blocks.

Each of the 11 blocks contains 8 words each being of 32 (bits), in the case where the pertinent block is transmitted at 1600 (bps); it contains 16 words each being of 32 (bits), in the case where it is transmitted at 3200 (bps); and it contains 32 words each being of 32 (bits), in the case where it is transmitted at 6400 (bps).

Besides, in the case of the transmission at 3200 (bps), the 16 words of each block are separated into 2 phases every 8 words. Further, in the case of the transmission at 6400 (bps), the 32 words of each block are separated into 4 phases every 8 words. That is, each phase has 8 words per block and 88 words per air frame. In this embodiment, the 88 words constitute one communication frame. The assignment of the words to the phases within the block is illustrated in each of FIGS. 3 thru 5. The word "nx" indicated in each figure is the "(n+1)"th word (word No. n) of the phase "x" within the pertinent block.

As shown in each of FIGS. 3–5, one word contains information bits of 21 bits, BCH (Bose-Chaudhuri-Hocquenghem) bits of 10 bits which form an error correcting code for the 21 information bits, and a parity bit of one bit which expresses the parity of 31 bits consisting of the 21 information bits and the 10 BCH bits.

Here, for a counterplan to burst errors, the respective words are interleaved in the pertinent block, and the resulting block is transmitted. That is, the respective words are sent in a sequence from the uppermost left-end bit (bit #1) toward the lowermost right-end bit (as viewed in the columns of the 32 bits shown in each of FIGS. 3–5), in such a manner that one bit of the first word is followed by one bit of the second word.

Meanwhile, the 88 words of each communication frame are formed as shown in FIG. 6. That is, block information (BI), address information (AF), vector information (VF), message information (MF) and idle information (IB) are stored as the 88 words.

More specifically, the positions of the address information (AF) and vector information (VF) are stored in the block information (BI) of each communication frame. Besides, in the communication frame of the head air frame of each cycle, the time (real time) at which the information of the pertinent air frame is to be transmitted is transmitted as the block information (BI). Thus, the real time is transmitted once in 4 (minutes). Further, in a case where the radio paging system supports a time zone and a local channel, information on them can also be transmitted as the block information (BI).

Next, the address of the receiver (4 in FIG. 1) to receive the pertinent communication frame is stored in the address information (AF). Besides, information items for designating the type of the message information (MF), the content of service, etc. are stored in the vector information (VF). The idle information (IB) is invalid word information.

In such a construction, the receivable frequency channel of each receiver 4, the receivable frame No. thereof, the receivable phase thereof and the address thereof are previously allotted to and set in the receiver 4. In addition, the transfer rates which can be handled differ depending upon the individual receivers 4. That is, there coexist the receivers 4 which can process the communication frames of 1600 (bps), the receivers 4 which can process the communication frames of 3200 (bps), and the receiving 4 which can process the communication frames of 6400 (bps). Each of the receivers 4 receives the communication frame of the allotted phase of the air frame of the allotted frame No. on the allotted frequency channel. Subsequently, it corrects the transmission errors of the respective words by the use of the BCH bits affixed to each word. Here, in a case where the address information (AF in FIG. 6) of the received communication frame agrees with the address of the particular receiver 4 itself, this receiver executes processing correspondent to the vector information (VF) of the communication frame, and it displays the message sent by the message information (MF), on the display unit or the like included therein. Besides, in a case where the message information (MF) is transmitted in an encrypted state, the particular receiver 4 also executes processing, e.g., for decrypting the received message information (MF) by the use of a decryption key registered therein beforehand. Incidentally, as will be explained later, the communication frame directed to a certain one of the receivers 4 is transmitted at the transfer rate which the particular receiver 4 can handle.

In the above embodiment, one communication frame has been described as being constituted by the 88 words of one phase of one air frame. It is also allowed, however, to divide one communication frame into a plurality of communication subframes, which are subjected to repetitive transmissions.

The air frames which are transmitted from the transmitting stations 2 to the receivers 4 in this embodiment, have the format as thus far explained.

Now, the constituents of the radio paging system according to this embodiment will be described in detail.

First, the details of the central station 1 will be explained.

As shown in FIG. 1, the central station 1 includes a subscriber database 13, an exchange 11 and a coding module 12.

Information items are registered in the subscriber database 13 beforehand. They contain the Nos. of subscribers, as well as the addresses of the receivers 4 which are used by the subscribers of the subscriber Nos., the frequency channels, frame Nos. and phases which are allotted to the receivers 4, the encryption keys which are used by the receivers 4, the transfer rates which can be handled by the receivers 4, and so forth.

Upon receiving a message from the public network 5, the exchange 11 searches the subscriber database 13 by a sequential retrieval based on the subscriber No. affixed to the message, thereby obtaining the encryption key which corresponds to the message, and the frequency channel, frame No., phase and transfer rate with which the message is to be transmitted. Subsequently, the exchange 11 encrypts the message by the use of the encryption key searched for. It also creates an exchange frame shown in FIG. 7, every air frame on the basis of the information items searched for.

As illustrated in FIG. 7, one exchange frame corresponds to one air frame which is transmitted from the transmitting station 2. The exchange frame contains the frame length thereof, the frame No. of the corresponding air frame, the frequency channel for transmitting the corresponding air frame, the cycle No. of the cycle for transmitting the corresponding air frame, message information to be transmitted by the corresponding air frame, CRC (cyclic redundancy check) information for correcting any error of this exchange frame, and so forth. Herein, the message information of the exchange frame is so organized that the synchronization field, the BCH bits and parity bits of the respective words of each of the blocks, and the real time of the block information are excluded from the corresponding air frame. In other words, the air frame can be formed when the synchronization field, the BCH bits and parity bits of the respective words of each of the blocks, and the real time of the block information are affixed to the message information shown in FIG. 7.

The exchange 11 transmits such an exchange frame to the coding module 12 at a predetermined transfer rate by the use of any of a dedicated digital line, a public digital line, and a plurality of analog lines.

In the ensuing description, the number of the frequency channels to be used in this embodiment shall be assumed 8 (eight). In this case, the exchange 11 needs to transmit the exchange frames at a speed of, at least, 51200 (bps) as the maximum value for the reasons that the maximum transmission speed of the transmitting station 2 for the air frame is 6400 (bps), and that the number of the air frames to be simultaneously transmitted is 8 equal to the number of the frequency channels. Here, it is assumed that a digital transmission line which is realized on the public digital line or the dedicated digital line has a transmission speed of 192 (kbps), while the line capacity of the public digital line or the dedicated digital line is 64 (kbps). It is also assumed that a guaranteed transmission speed and line capacity in the case of using the modem of the analog line is 9600 (bps). In this case, with the public digital line or the dedicated digital line, the exchange frames to be simultaneously transmitted on the different frequency channels are subjected to time division multiplexing and then transmitted by the use of the single line, whereby the individual exchange frames can be transmitted without any problem. In contrast, the exchange frames cannot be sent by the single analog line. In the case of using the analog lines, therefore, the exchange 11 transmits the exchange frames to the coding module 12 by using one analog line every frequency channel, namely, 8 analog lines in total. Incidentally, on this occasion, the transfer rate of the air frame does not agree with that of each part of the air frame which is transmitted from the transmitting station 2.

Further, in this embodiment, two transmission lines or channels for transmitting the exchange frames from the exchange 11 and the coding module 12 are laid for the purpose of duplexing. Thus, the exchange 11 transmits the same contents to the coding module 12 by the use of the lines of the independent channels. By way of example, two public digital lines or two dedicated digital lines are used in duplex fashion with one channel formed by one of the lines. Also, 16 analog lines are separated into two groups each of which consists of 8 analog lines, and which are used as the two channels in duplex fashion.

Subsequently, the coding module 12 receives the exchange frames from the exchange 11 and generates the air frames on the basis of the received exchange frames. It distributes the generated air frames to the transmitting stations 2.

Figure 8:
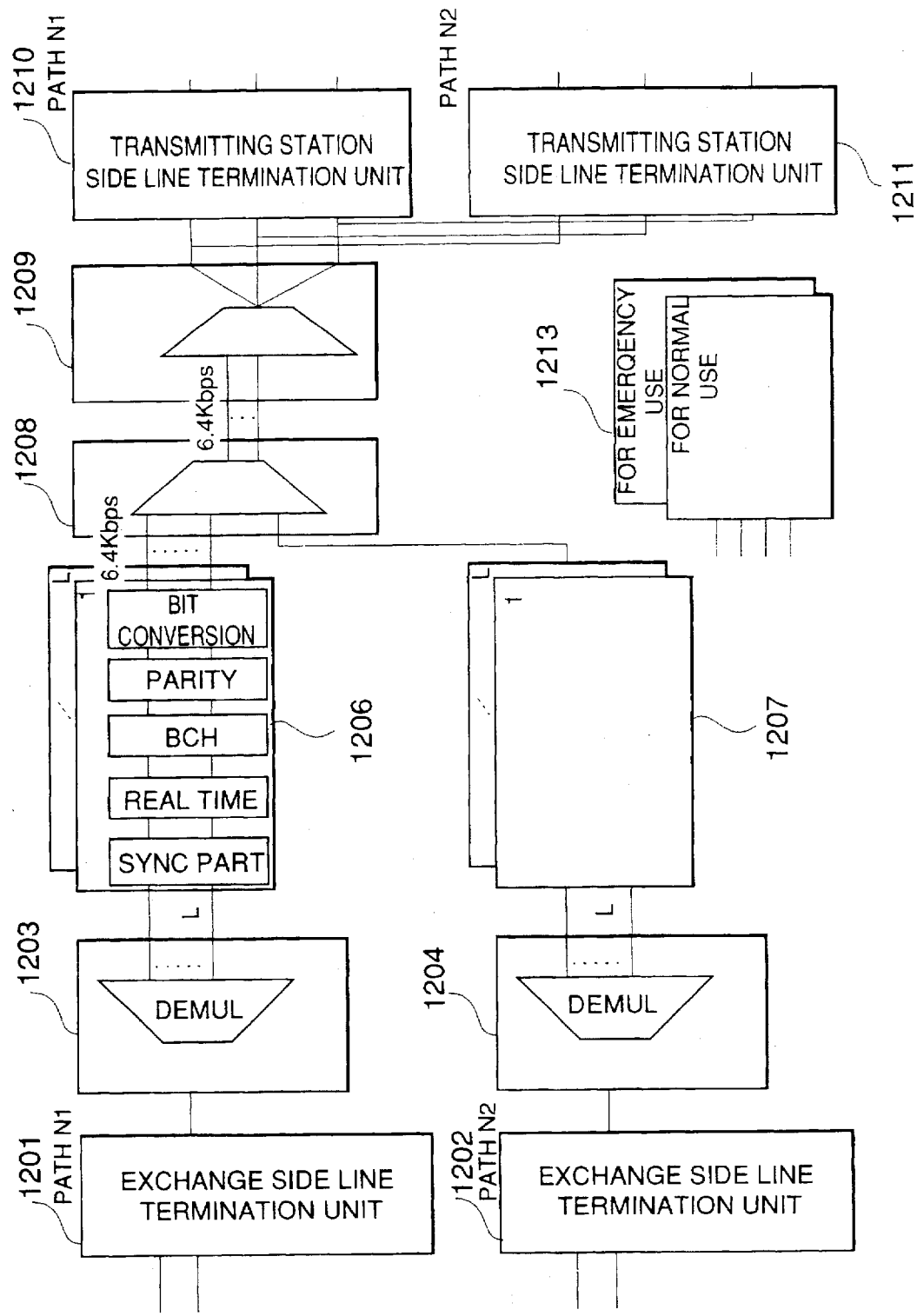
FIG. 8 is a block diagram showing the construction of a coding module in a central station according to the embodiment of the present invention.

FIG. 8 illustrates the construction of the coding module 12.

As shown in the figure, the coding module 12 includes two exchange-side line termination units (or data circuit terminating equipment) 1201 and 1202, two exchange-side muldems (multiplexers/demultiplexers) 1203 and 1204, two sets of coders 1206 and 1207 each set consisting of coders which are equal in number to the frequency channels, a selector 1208, a transmitting-station-side muldem 1209, two transmitting-station-side line termination units 1210 and 1211, and supervisory controllers 1213.

Of the lines of the duplexed channels connected with the exchange 11, the line of one channel is connected to the exchange-side line termination unit 1201, and that of the other channel is connected to the exchange-side line termination unit 1202. The exchange-side line termination unit 1201, the exchange-side muldem 1203 and the set of coders 1206 constitute an exchange-side path N1, while the exchange-side line termination unit 1202, the exchange-side muldem 1204 and the set of coders 1207 constitute an exchange-side path N2. The selector 1208 selects the outputs of either of the paths N1 and N2. Thus, the exchange-side line termination units, the exchange-side muldems and the sets of coders are provided in duplex fashion, and the selector 1208 determines which of the duplexed paths is to be used as a valid path.

Besides, in order to duplex the line between the coding module 12 and each transmitting station 2, there are provided the two transmitting-station-side line termination units 1210 and 1211 which constitute transmitting-station-side paths N1 and N2, respectively. These two transmitting-station-side line termination units 1210 and 1211 transmit the same contents to the transmitting stations 2.

In this manner, the operations of the paths N1 and N2 are the same on both the exchange side and the transmitting station side. Therefore, the operation of the coding module 12 shall be explained below by representatively mentioning the paths N1 on both the exchange side and the transmitting station side.

Upon accepting the exchange frames from the exchange 11 through the line of one channel in the lines of the two duplexed channels, the exchange-side line termination unit 1201 delivers them to the exchange-side muldem 1203. However, in the case where one channel is formed of the 8 analog lines, the exchange-side line termination unit 1201 subjects the exchange frames received from the respective analog lines, to the time division multiplexing, and it delivers the resulting multiple signal to the exchange-side muldem 1203. In addition, the exchange-side line termination unit 1201 makes the corrections of the transmission errors of the respective exchange frames on the basis of the CRC's thereof.

Subsequently, the exchange-side muldem 1203 demultiplexes the received exchange frames multiplexed in time division. It distributes the demultiplexed exchange frames to those coders in the coder set 1206 which take charge of the frequency channels for transmitting the pertinent exchange frames, on the basis of the information items of the frequency channels affixed to the exchange frames.

Thereafter, each of the coders in the coder set 1206 creates the air frame from the distributed exchange frame. More specifically, the coder obtains the BCH bits and parity bit of each of the words contained in each of the blocks, and the real time for transmitting the pertinent air frame. The BCH bits and parity bits of the words obtained are affixed to the respective words of the message information of the exchange frame, while the real time obtained is affixed to the block information. Further, the synchronization field formed on the basis of the information items of the transfer rate, etc. contained in the exchange frame is affixed to the head. Then, the air frame is created. Here, the real time is determined on the basis of the current time which is managed by the supervisory controller 1213. The management of the current time in the supervisory controller 1213 will be detailed later.

Here, the bit lengths of the air frames created by the individual coders of the coder set 1206 in this way are not equal. The reason therefor is that the numbers of bits contained in the air frames differ depending upon the transfer rates explained before. Moreover, the air frames created by the individual coders need to be multiplexed in time division and then transmitted to the transmitting stations 2 as will be explained later. In general, however, it is not easy to multiplex the frames of different bit lengths in time division in this manner and to ensure the synchronization of the frames on a receiving side.

According to this embodiment, this embodiment, therefore, in each coder, the bits (synchronization part #1 (S1) and the individual blocks) of the pertinent air frame to be transmitted at 1600 (bps) are respectively converted into 2 bits, while the bits (synchronization part #2 (S2) and the individual blocks) thereof to be transmitted at 3200 (bps) are respectively converted into 4 bits. The conversion is carried out in such a way that, behind one bit to be converted, one bit (or three bits) is (are) inserted. The air frames endowed with the equal bit lengths by such conversions are all sent to the transmitting-station-side muldem 1209 at the transfer rate of 6400 (bps). Owing to this contrivance, the air frames having the equal lengths can be indiscriminately processed by circuits of similarly simple arrangements at the stages of the transmitting-station-side muldem 1209, et seq.

Figure 9:
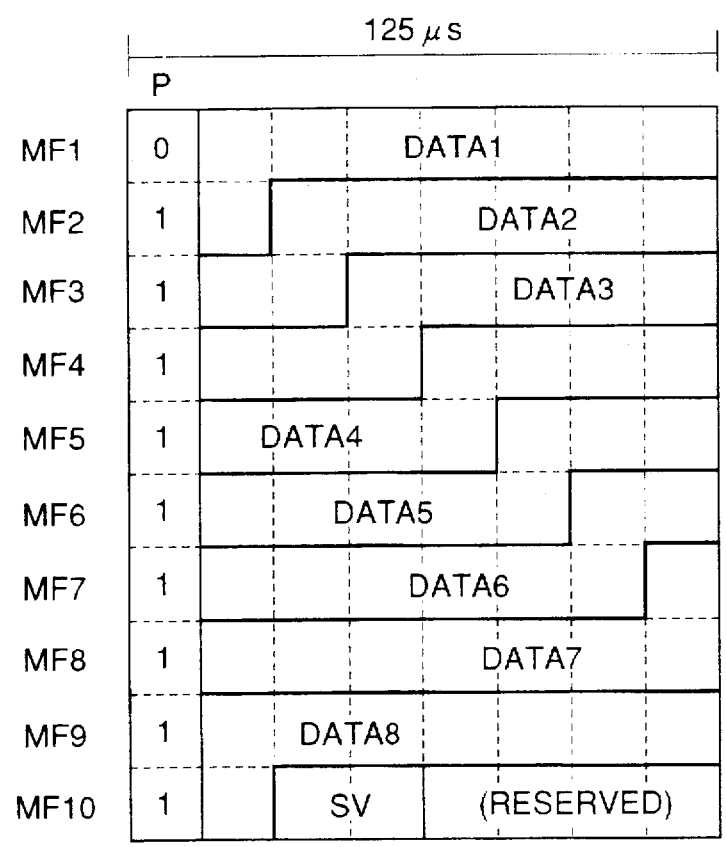
FIG. 9 is a diagram showing the configurations of multiframes which are employed in the embodiment of the present invention.

The transmitting-station-side muldem 1209 subjects to time division multiplexing the 8 air frames thus sent from the 8 coders of the coder set 1206 and a supervisory control signal of 1600 (bps) sent from the supervisory controller 1213, to thereby generate a multi-frame shown in FIG. 9 as is transferred at 64 (kbps). Referring to FIG. 9, symbol "DATAn" ndenotes data of 8 bits in the nth air frame. In addition, symbol "SV" denotes the supervisory control signal. Besides, letter P indicates parity bits for the data of the multi-frame. One multi-frame corresponds to the 64 bits of the air frames (8 bits per air frame) and the 2 bits of the supervisory control signal SV. Incidentally, the parallel bits of the multi-frames are transferred in a downward sequence from the uppermost row toward the lowermost one as viewed in the column direction of FIG. 9. That is, the multi-frame is transferred in the sequence of the rows "MF1", "MF2", . . . , and "MF10" indicated in the figure.

The multi-frames created in this way are successively sent to the transmitting-station-side line termination unit 1210.

The transmitting-station-side line termination unit 1210 is connected with each of the transmitting stations 2 by any of 8 analog lines, one dedicated digital line and one public digital line. This line terminations unit 1210 transmits the multi-frames of 64 (kbps) accepted from the transmitting-station-side muldem 1209, to each transmitting station 2 by the 8 analog lines, the single dedicated digital line or the single public digital line.

For this purpose, the transmitting-station-side line termination unit 1210 executes the processing of putting the multi-frame of 64 (kbps) on the dedicated digital line or public digital line with a line capacity of 64 (kbps) as is formed on a digital transmission line having a transmission speed of 192 (kbps), and then transmitting it to the transmitting stations 2 each of which is connected by the dedicated digital line or public digital line, or the processing of divisionally putting the multi-frame of 64 (kbps) on the 8 analog lines, and then transmitting it to the transmitting stations 2 each of which is connected by the analog lines.

Figure 10:
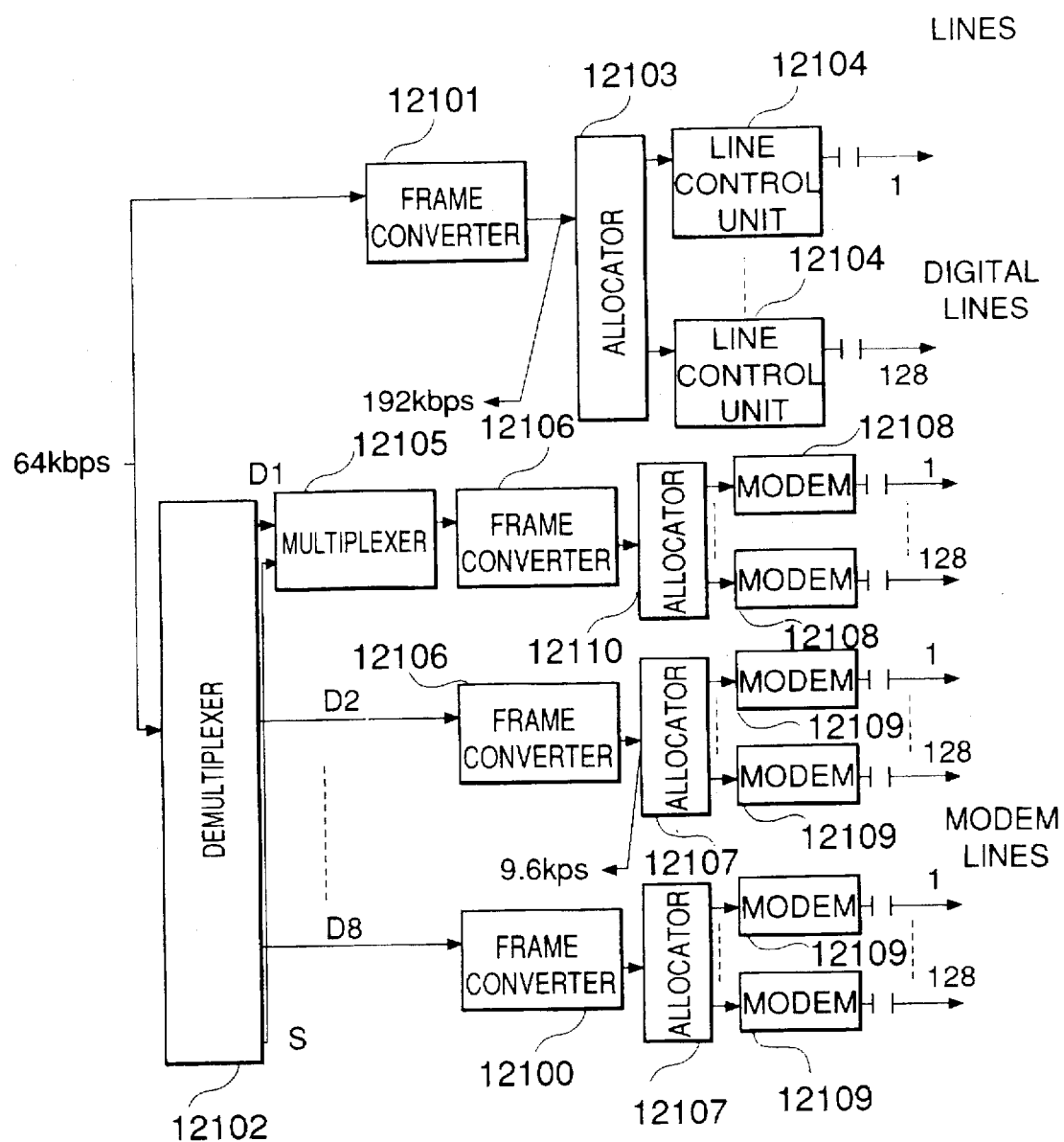
FIG. 10 is a block diagram showing the construction of a transmitting station side line termination unit in the central station according to the embodiment of the present invention.

FIG. 10 illustrates the construction of the transmitting-station-side line termination unit 1210 (or 1211).

Figure 11:
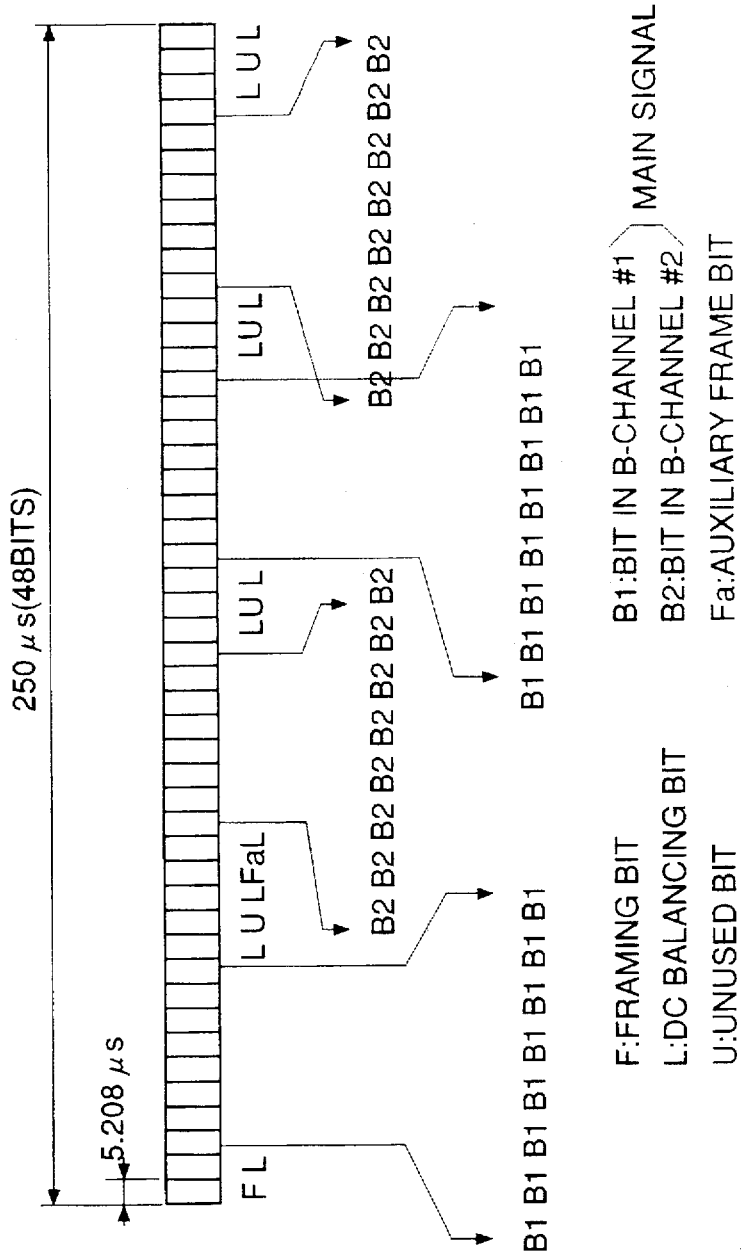
FIG. 11 is a diagram showing the transmission format of a dedicated digital transmission line.
Figure 12:
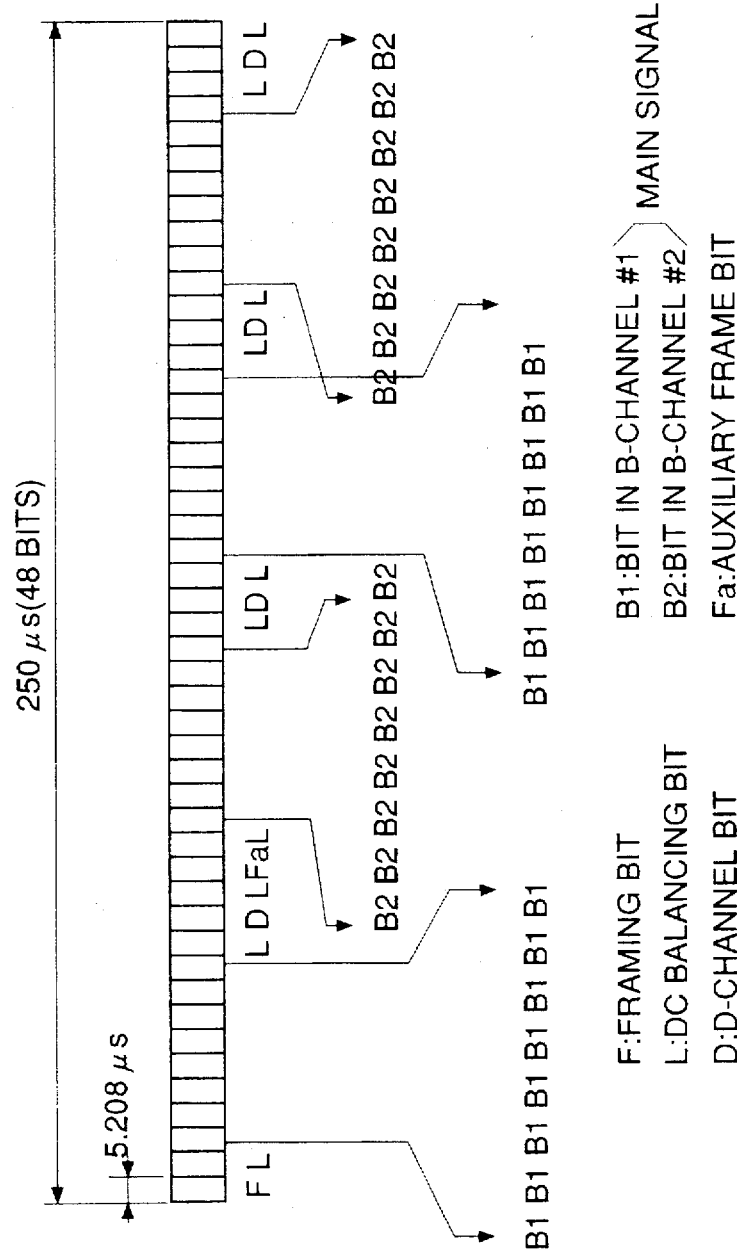
FIG. 12 is a diagram showing the transmission format of a public digital transmission line.

With such a construction, in order to put the multi-frame on the dedicated digital line or public digital line and then transmit it therethrough, the multi-frame may have its speed converted from 64 (kbps) into 192 (kbps) by a frame converter 12101 so as to be carried on a B1- or B2-channel shown in FIG. 11 or FIG. 12. The resulting multi-frame is allocated and delivered by an allocator 12103 to line control units 12104 each of which is connected with the corresponding one of the transmitting stations 2 (numbering 128 in FIG. 10) through the single dedicated digital line or public digital line.

Figure 13:
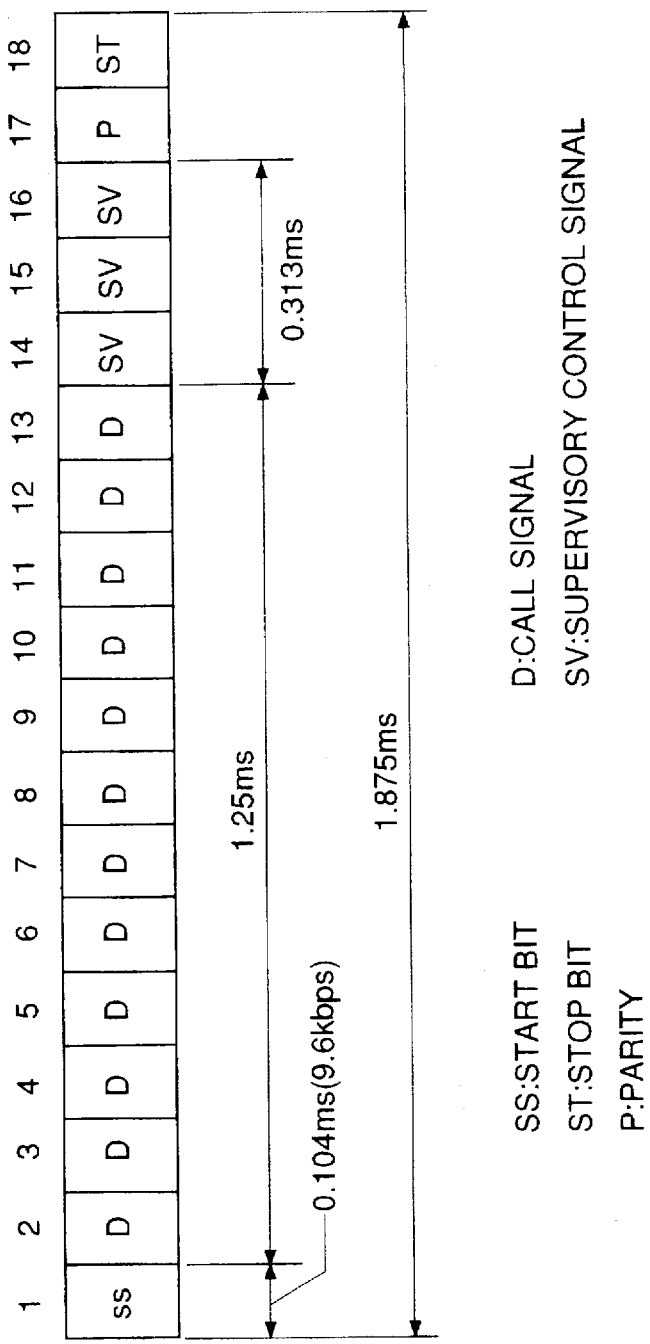
FIG. 13 is a diagram showing a rule for multiplexing air frames and a supervisory control signal, the rule being applied in a case where an analog line is used in the embodiment of the present invention.

On the other hand, in the case of divisionally putting the multi-frame on the 8 analog lines and then transmitting it to the transmitting stations 2, the bits of the multi-frame are demultiplexed again into the bits of the respective air frames and those of the supervisory control signal by a demultiplexer 12102. The 6400-bps bits of the air frame of the first frequency channel and the 1600-bps bits of the supervisory control signal thereof are multiplexed as shown in FIG. 13 by a multiplexer 12105, and the proper bits of a flag, a parity etc. are affixed to the multiple signal by a frame converter 12106, thereby creating a frame of 9600 (bps). The created frame is allocated and delivered by an allocator 12110 to the first modem 12108 which takes charge of the first analog line within one of the respective sets of 8 analog lines (the respective sets being connected with the different transmitting stations 2). Likewise, regarding the 6400 (bps) bits of the air frames of the second-eighth frequency channels, proper bits are affixed to multiple signals by frame converters 12106, thereby creating frames of 9600 (bps), respectively. The created frames are allocated and delivered by allocators 12107 to modems 12109 which take charge of the second-eighth analog lines within corresponding ones of the sets of 8 analog lines, respectively.

Here, the transmitting-station-side line termination unit 1211 of the path N2 (shown in FIG. 8) operates similarly to the transmitting-station-side line termination unit 1210 of the path N1 as described above. Thus, the two channels of transmission lines are laid also between the central station 1 and each transmitting station 2 so as to duplex the connection therebetween. The duplexed connection is realized by two public digital lines or two dedicated digital lines which form the two channels, or by 16 analog lines separated into two groups each of which consists of 8 analog lines and which form the two channels.

By the way, the exchange-side path N1 and exchange-side path N2 of the coding module 12 are periodically changed-over by the selector 1208 in order to verify the normalities thereof. Besides, in a case where either path N1 or N2 under use has become defective, the defective path is changed-over to the other path by the selector 1208. Such changeover operations are controlled by the supervisory controller 1213.

The central station 1 has been described above. The supervisory controllers 1213 in the central station 1, however, shall be described in detail later.

Now, the transmitting stations 2 will be described.

As shown in FIG. 1, each transmitting station 2 includes a synchronizing module 21, and a plurality of transmitters 22 each of which takes charge of one frequency channel.

Figure 14:
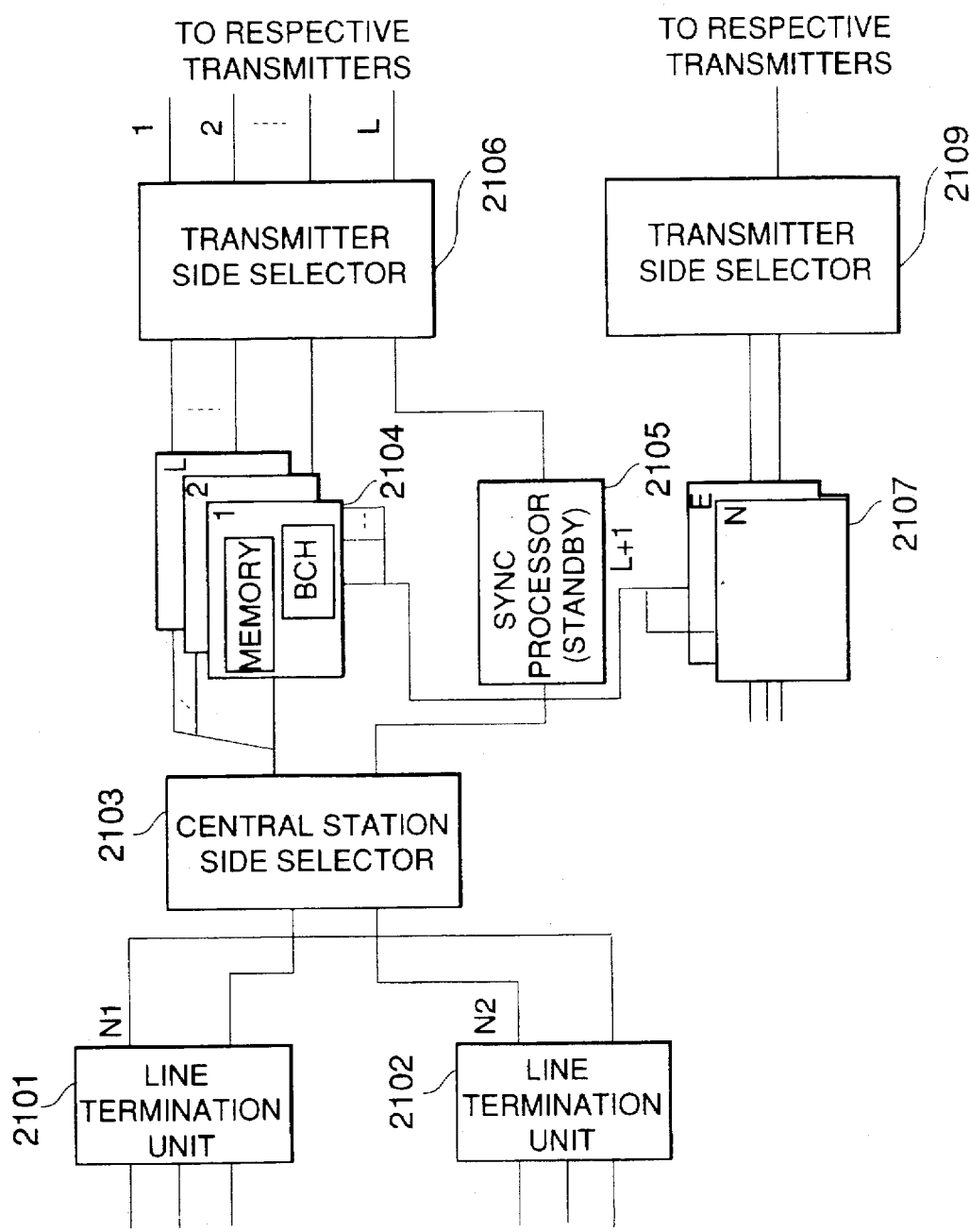
FIG. 14 is a block diagram showing the construction of a synchronizing module in a transmitting station according to the embodiment of the present invention.

FIG. 14 illustrates the construction of the synchronizing module 21.

As shown in the figure, the synchronizing module 21 includes two line termination units (or data circuit terminating equipment) 2101 and 2102, a central-station-side selector 2103, a set of synchronization processors 2104 which are equal in number to the frequency channels, a standby synchronization processor 2105, transmitter-side selectors 2106 and 2109, and supervisory controllers 2107.

The two line termination units 2101 and 2102 are respectively connected to the lines of the corresponding channels in those lines of the two channels which are connected with the central station 1. Each of the units 2101 and 2102 restores the air frames and the supervisory control signal from the multi-frame which has been sent from the central station 1 in the format explained before. The central-station-side selector 2103 validates only the outputs of either of the two line termination units 2101 and 2102.

The supervisory control signal which has been restored by the line termination unit 2101 or 2102 validated by the central-station-side selector 2103, is sent to the supervisory controller 2107. The restored air frames are respectively sent to those synchronization processors in the set of synchronization processors 2104 which take charge of the frequency channels for transmitting the pertinent air frames.

Each synchronization processor included in the set of synchronization processors 2104 stores the sent air frame in a memory once. It checks the BCH bits of the respective words of each of the blocks of the corresponding air frame, to detect if any transmission error has developed. In a case where the transmission error has developed, the pertinent synchronization processor reports the detection of the transmission error to the supervisory controller 2107. When frequencies in the transmission error detections reported by the individual synchronization processors have exceeded a predetermined frequency value, the supervisory controller 2107 controls the central-station-side selector 2103 so as to select the outputs of that one of the two line termination units 2101 and 2102 which is not currently validated. That is, the line termination units 2101 and 2102 are changed-over.

As stated before, the cycle No. and frame No. of each air frame are stored in the memory of the corresponding synchronization processor which is included in the set of synchronization processors 2104, the real time is contained in the block information (BI) of the frame No. 0 (zero) which is the head frame of each cycle, and the current time is managed by the supervisory controller 2107. In cooperation with the corresponding synchronization processor, the supervisory controller 2107 reads out the particular air frame from the memory and sends the read-out air frame to the transmitter 22 in charge of the corresponding frequency channel in order that the particular air frame may be transmitted to the receiver 4 at the time which is designated in accordance with the cycle No., frame No., real time and current time mentioned above. In addition, each of the synchronization processors checks the synchronization field of the corresponding air frame to detect the transfer rates at which the synchronization part #2 (S2) and the respective blocks are to be transmitted, and it reports the detected transfer rates to the supervisory controller 2107. Then, the supervisory controller 2107 notifies the reported transfer rates to the transmitter 22 which is to transmit the corresponding air frame.

As to the air frame sent from the corresponding synchronization processor, each transmitter 22 restores the bits of the parts of the particular air frame converted by the coding module 12 of the central station 1, to the original bits, and it transmits the synchronization part #1 (S1) and frame information (FI) of the particular air frame at 1600 (bps) and the other parts thereof at the transfer rates notified by the supervisory controller 2107.

Incidentally, the standby synchronization processor 2105 operates as follows: In a case where any synchronization processor included in the set of synchronization processors 2104 has failed, the standby synchronization processor 2105 is validated by the central-station-side selector 2103 or the transmitter-side selector 2106 and is used as a substitute for the synchronization processor having failed.

Besides, lines in a direction from the synchronizing module 21 of each transmitting station 2 to the coding unit 12 of the central station 1 (in the "up" direction) are respectively connected between the line termination units 2101 and 2102 of the synchronizing module 21 of the pertinent transmitting station 2 and the transmitting-station-side line termination units 1210 and 1211 of the coding unit 12 of the central station 1. Using the lines, the supervisory controller 2107 of the synchronizing module 21 of the pertinent transmitting station 2 can send the "up" supervisory control signal to the supervisory controller 1213 of the coding module 12 of the central station 1.

Here, as stated before, the individual transmitting stations 2 must transmit the identical air frame at substantially the same time in order to eliminate the malfunctions or improper operations of the receivers 4 attributed to the radio interference. In other words, the transmissions of the identical air frame from all the transmitting stations 2 must be held in synchronism.

How the transmissions of the air frame are synchronized in this embodiment will be explained below.

In this embodiment, as shown in FIG. 15 or FIG. 16, one of the transmitting stations 2 laid out in each service area is set as a genuine or original standard station. In addition, one of the transmitting stations 2 laid out in the pertinent service area is set as a standby standard station. (In the ensuing description, the genuine standard station, the standby standard station and the other transmitting stations shall be simply called the "transmitting stations" collectively when they need not be especially distinguished.) Besides, in this embodiment, each of the genuine standard station and standby standard station is connected with the central station 1 by a dedicated digital line or a public digital line.

Further, the supervisory controller 2107 of the synchronizing module 21 of each transmitting station 2 and that 1213 of the coding module 12 of the central station 1 have constructions for controlling the synchronization of the transmissions of the air frame.

Figure 17:
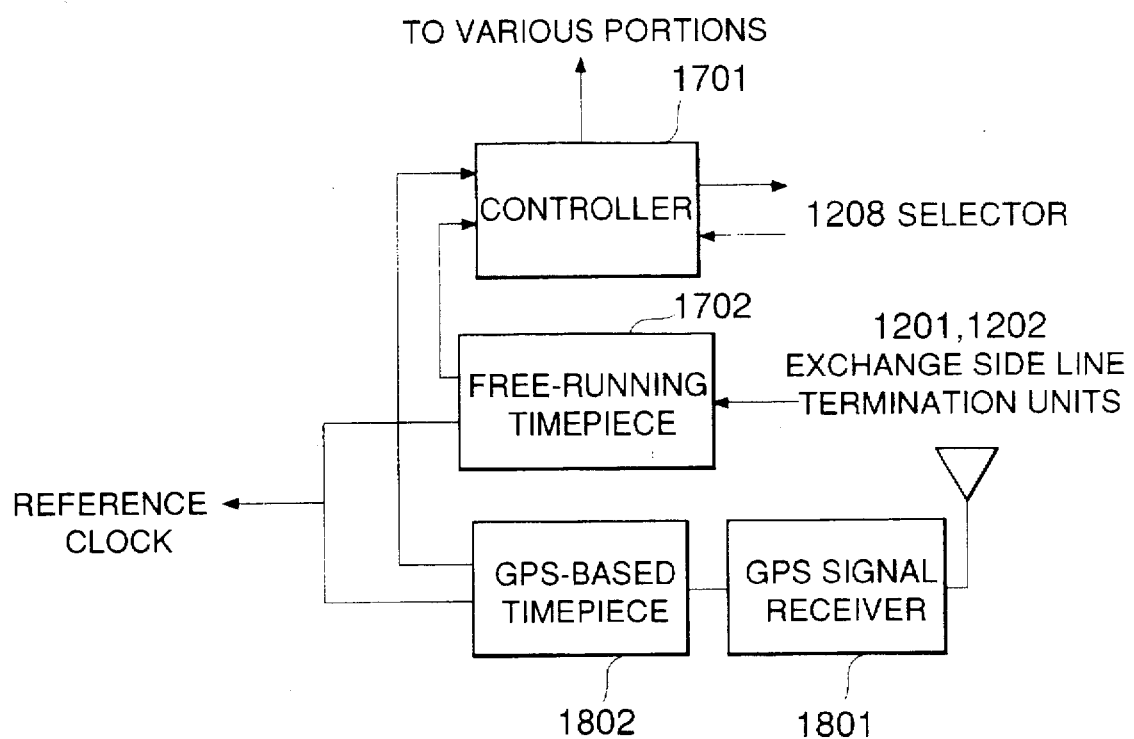
FIG. 17 is a block diagram showing the construction of a supervisory controller in the central station according to the embodiment of the present invention.

More specifically, as shown in FIG. 17, the supervisory controller 1213 of the coding module 12 of the central station 1 includes a GPS (global positioning system) signal receiver 1801, a GPS-based timepiece 1802, a free-running timepiece 1702, and a controller 1701. The control outputs of the controller 1701 are connected to the various portions of the coding module 12. Besides, the lines of the controller 1701 for transmitting and receiving the supervisory control signals to and from the individual transmitting stations 2 are connected to the transmitting-station-side muldem 1209.

Figure 18:
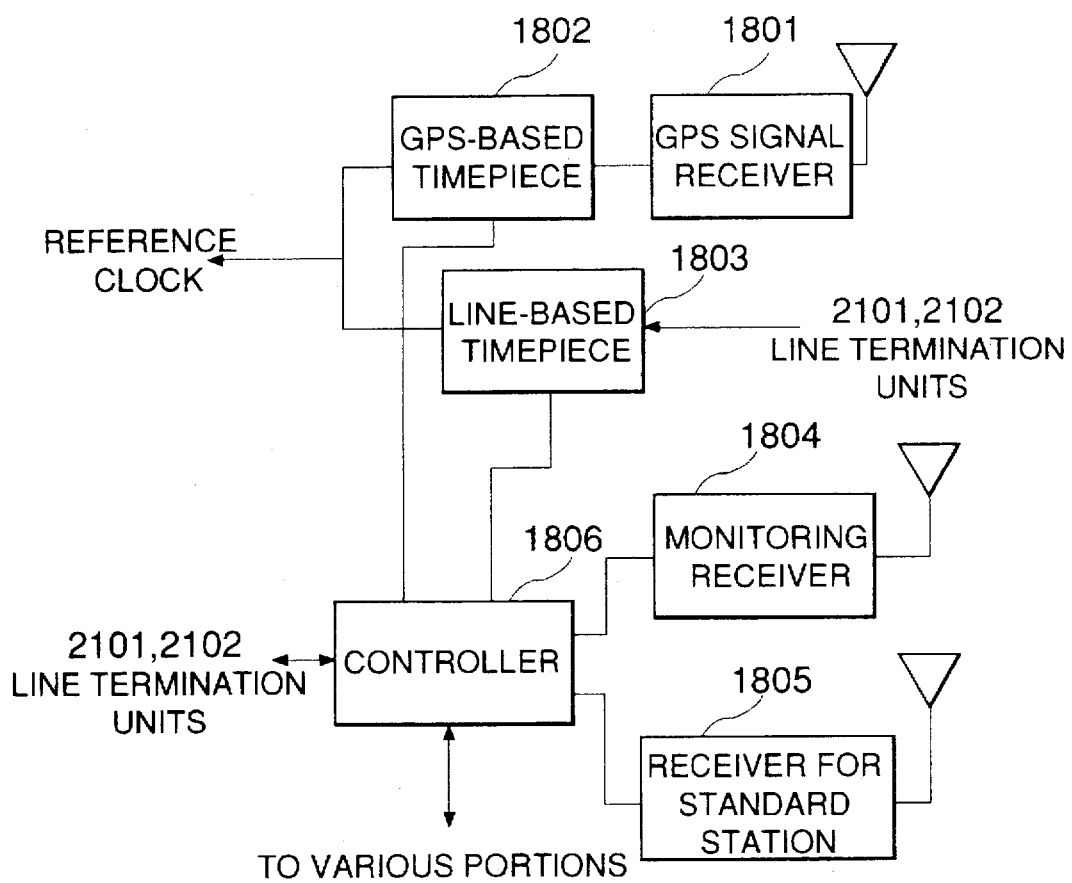
FIG. 18 is a block diagram showing the construction of a supervisory controller in the transmitting station which is connected to the central station by a digital line in the embodiment of the present invention.

Next, as shown in FIG. 18, the supervisory controller 2107 of the synchronizing module 21 of each of the transmitting stations 2, which are other than the genuine standard station and the standby standard station and which are respectively connected to the central station 1 by dedicated digital lines or public digital lines, includes a GPS signal receiver 1801, a GPS-based timepiece 1802, a line-based timepiece 1803, a monitoring receiver 1804, a receiver 1805 for the standard station, and a controller 1806. The control outputs of the controller 1806 are connected to the various portions of the synchronizing module 21. Besides, the lines of the controller 1806 for transmitting and receiving the supervisory control signals to and from the central station 1 are connected to the line termination units 2101 and 2102.

Figure 19:
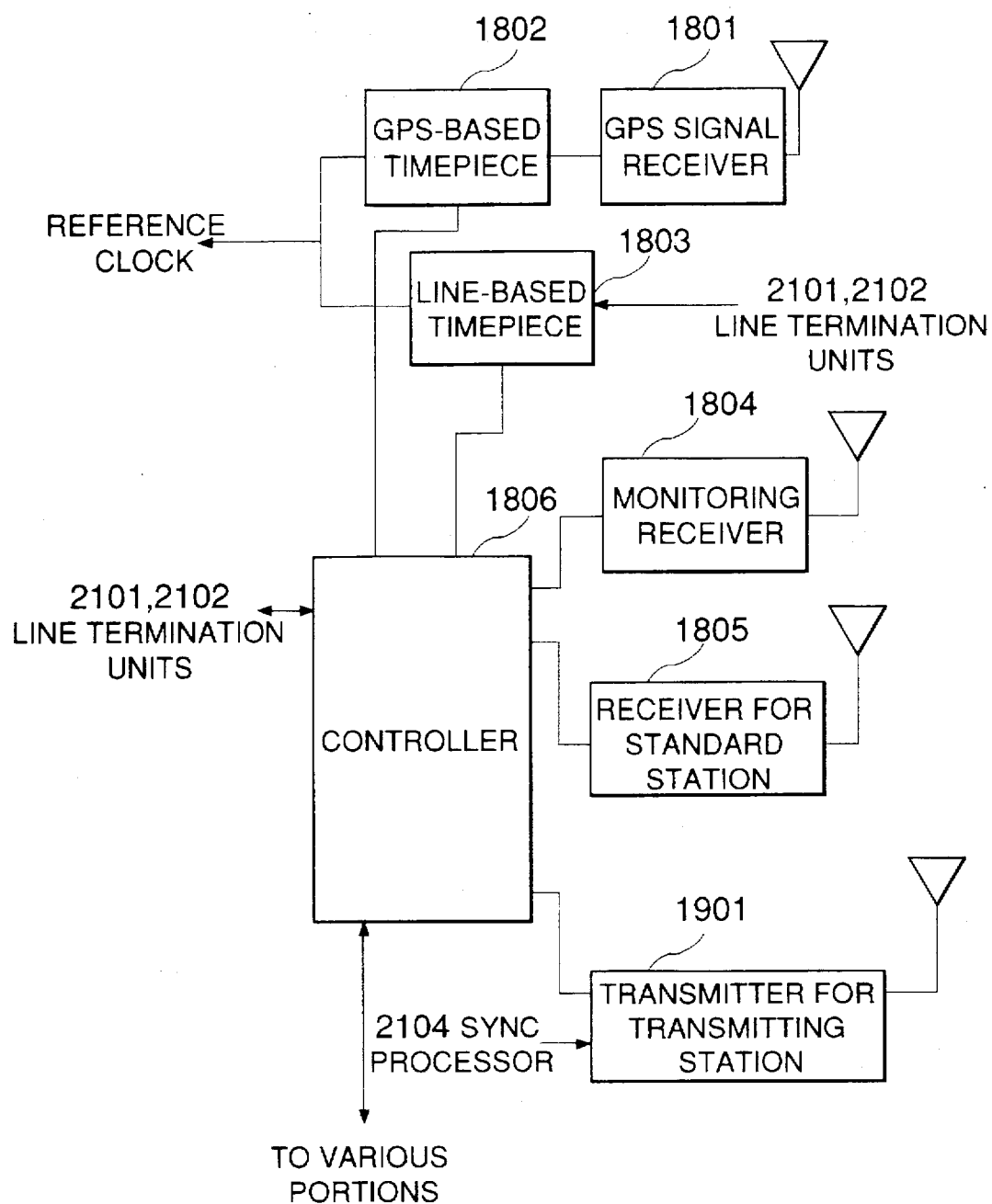
FIG. 19 is a block diagram showing the construction of the supervisory controller of the standby standard station according to the embodiment of the present invention.

As seen from FIG. 19, the standby standard station includes the construction shown in FIG. 18, and also a transmitter 1901 for the transmitting stations 2, this transmitter serving to transmit the air frame with a frequency channel directed toward the transmitting stations 2.

Figure 20:
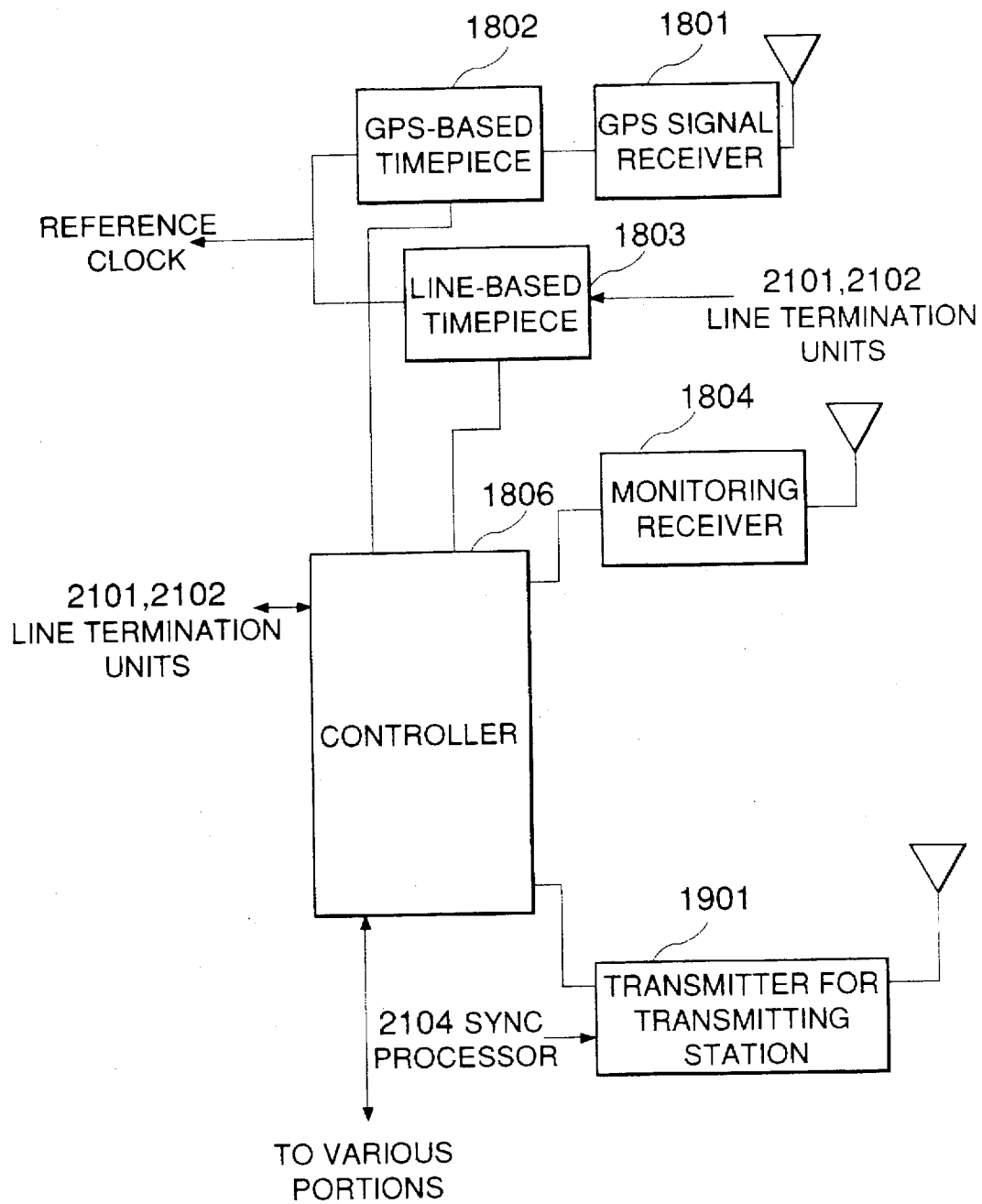
FIG. 20 is a block diagram showing the construction of the supervisory controller of the standard station according to the embodiment of the present invention.

As shown in FIG. 20, the genuine standard station includes a GPS signal receiver 1801, a GPS-based timepiece 1802, a line-based timepiece 1803, a monitoring receiver 1804, a controller 1806, and a transmitter 1901 for the transmitting stations 2, this transmitter serving to transmit the air frame with a frequency channel directed toward the transmitting stations 2.

Figure 21:
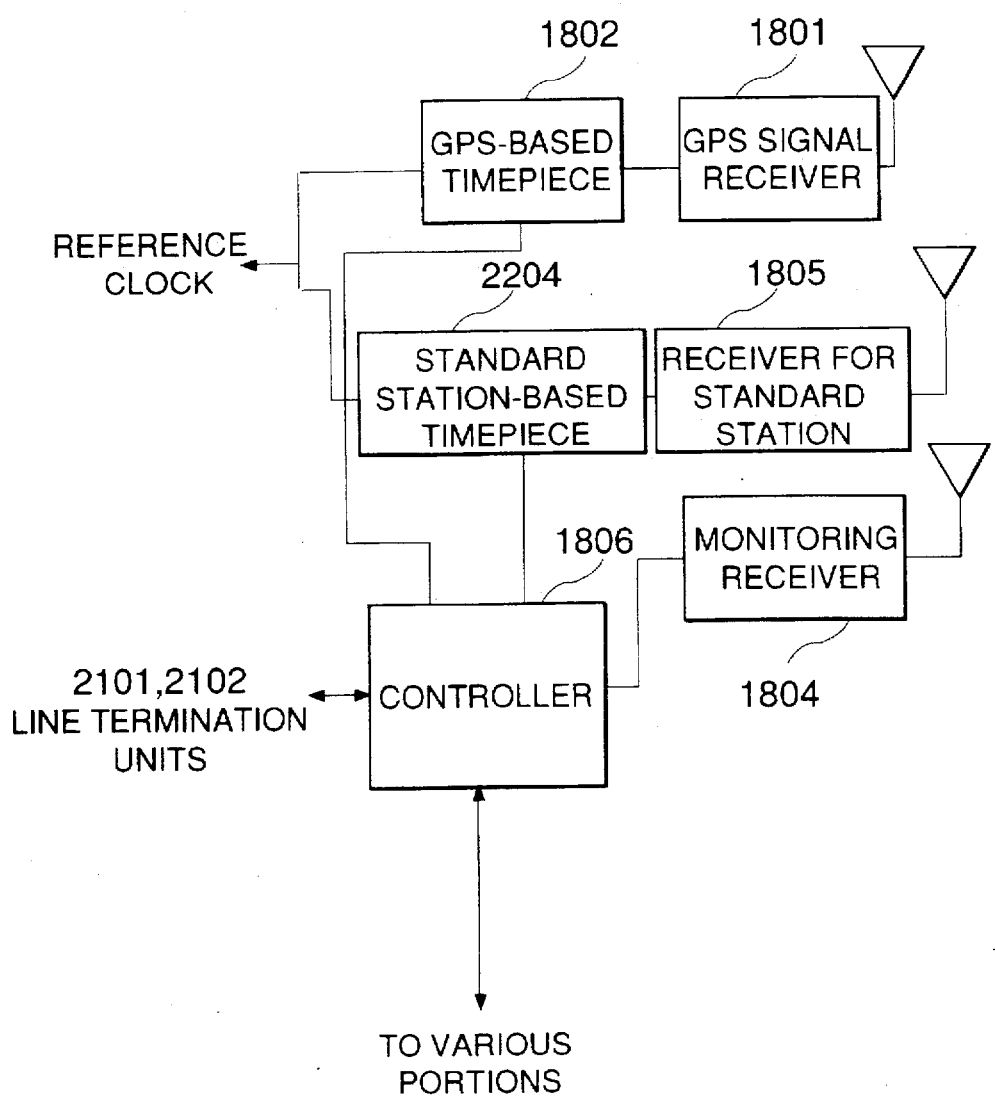
FIG. 21 is a block diagram showing the construction of a supervisory controller in the transmitting station which is connected to the central station by an analog line in the embodiment of the present invention.

As shown in FIG. 21, the supervisory controller 2107 of the synchronizing module 21 of each of the transmitting stations 2, which are other than the genuine standard station and the standby standard station and which are respectively connected to the central station 1 by analog lines, includes a GPS signal receiver 1801, a GPS-based timepiece 1802, a monitoring receiver 1804, a receiver 1805 for the standard station, a standard station-based timepiece 2204 and a controller 1806.

The operation of synchronizing the transmissions of the air frame will be explained below with stress laid on the operations of the supervisory controllers 1213 and 2107.

In the initial state of the radio paging system, the GPS signal receivers 1801 of the supervisory controller 1213 of the central station 1 and that 2107 of each transmitting station 2 receive the signal of the current time transmitted from a GPS satellite, and the GPS-based timepieces 1802 of the supervisory controllers 1213 and 2107 are set by the time of the received signal. The time signal is transmitted from the GPS satellite at a high precision every second. Moreover, the time delays of the signal transmissions from the GPS satellite to the individual stations on the earth are nearly equal, and the differences thereof are negligible. Accordingly, the identical time can be substantially accurately set in the GPS-based timepieces 1802 of the supervisory controllers 1213 and 2107 of the respective stations 1 and 2.

In addition, each of the GPS-based timepieces 1802 keeps the time for one second since the set current time, using a clock signal of predetermined frequency which is phased by a built-in PLL (phase-locked loop) with the timing of the reception of the current-time signal of the GPS satellite. Thus, it produces a current-time output sequentially and delivers the clock signal of the predetermined frequency as a reference clock.

Figure 22:
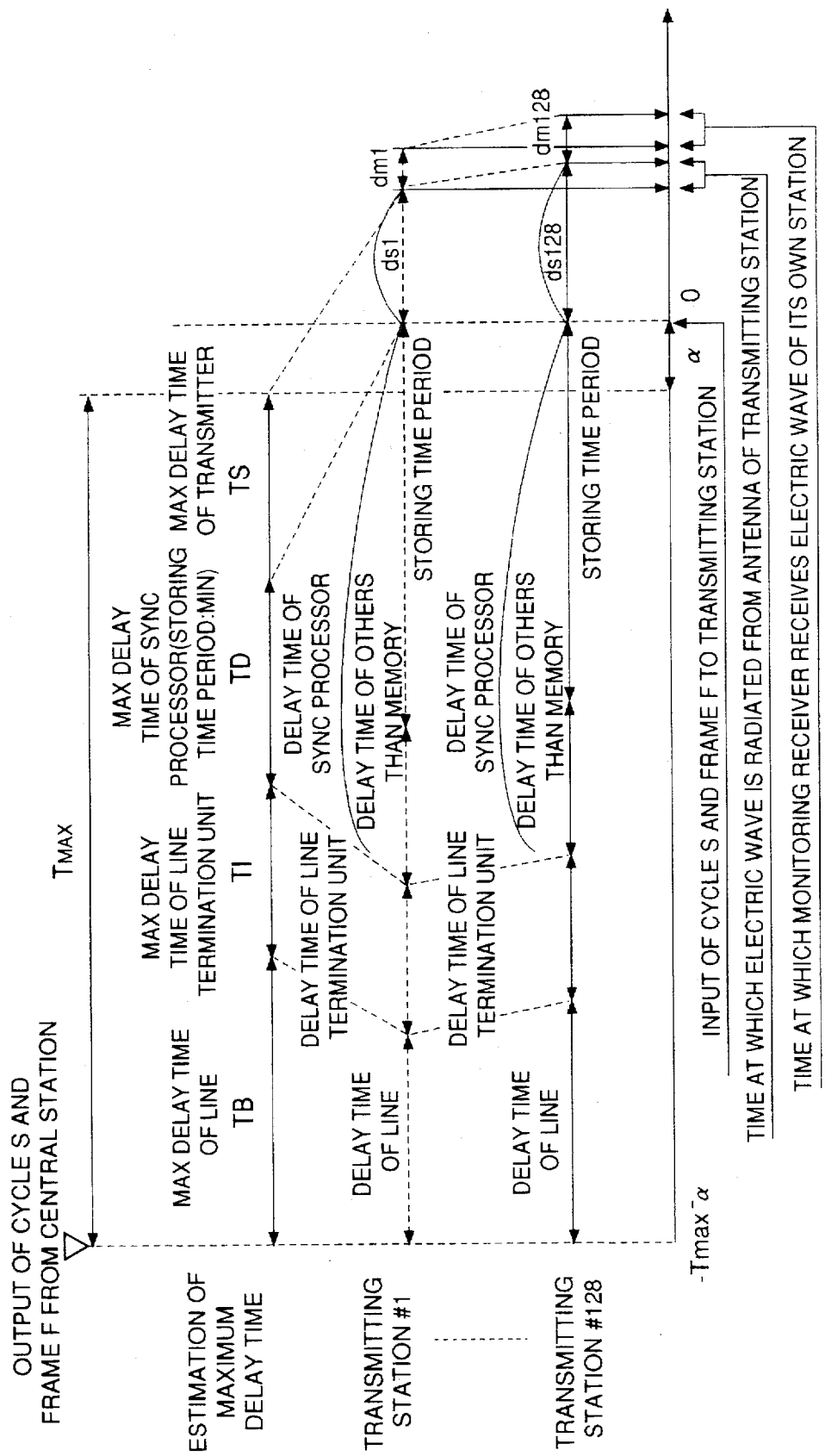
FIG. 22 is a diagram showing that evaluation of the delay time of a transmitter which is done in the embodiment of the present invention.

Referring also to FIG. 22, both the controller 1701 of the supervisory controller 1213 of the central station 1 and that 1806 of the supervisory controller 2107 of each transmitting station 2 have the maximum delay time $T_{MAX}$ preset therein, the time $T_{MAX}$ being the sum of the maximum value $T_B$ of a delay time ascribable to the line laid between the central station 1 and the transmitting station 2, the maximum value $T_I$ of a delay time ascribable to the line termination unit 2101 or 2102 of the synchronizing module 21 of the transmitting station 2, and the maximum value $T_D$ of a delay time expended in storing the air frame in the memory and immediately thereafter reading out the stored air frame within the corresponding synchronization processor. Besides, the controller 1806 of the supervisory controller 2107 of each transmitting station 2 has a delay time $d_m$ preset therein, the time $d_m$ being ascribable to the monitoring receiver 1804 as is evaluated from the design values thereof, etc.

In the initial state thus set, the radio paging system is first subjected to training.

In the training, the controller 1701 of the supervisory controller 1213 of the central station 1 causes any suitable coder in the set of coders 1206 (or 1207) to create an air frame for a test. A suitable time is designated as the real time of the block information (BI in FIG. 6) for the test air frame. Subsequently, the controller 1701 causes the particular coder to send the test air frame to the transmitting-station-side muldem 1209 so that the air frame may be transmitted from the line termination unit 1210 (or 1211) at the time $T_{MAX}$ before the designated real time with reference to the time of the GPS-based timepiece 1802 of the central station 1 itself. On this occasion, the portions of the coding module 12 closer to the transmitting station 2 with respect to the particular coder are operated by clocks which are synchronized with the reference clock delivered from the GPS-based timepiece 1802 of the central station 1 itself.

On the other hand, in the synchronizing module 21 of each transmitting station 2, the test air frame is once stored in the memory of the corresponding synchronization processor 2104. The controller 1806 of the supervisory controller 2107 controls the particular synchronization processor 2104 so that the test air frame may be read out of the memory and sent to the corresponding transmitter 22 through the selector 2106 when the time of the GPS-based timepiece 1802 of the transmitting station 2 itself has become the real time of the block information (BI) contained in the air frame.

Subsequently, the test air frame thus transmitted from the transmitter 22 is received by the monitoring receiver 1804 of the supervisory controller 2107 as shown in FIG. 22. Further, the controller 1806 evaluates the difference between the time of the reception of the air frame by the monitoring receiver 1804 and the real time of the block information (BI) in the air frame as have been measured with reference to the time of the GPS-based timepiece 1802. The evaluated time difference is regarded as the difference between a delay time ascribable to the transmitter 22 and the delay time $d_m$ ascribable to the monitoring receiver 1804, and a value which is obtained by subtracting the preset delay time $d_m$ of the monitoring receiver 1804 from the above evaluated time difference is set as the delay time $d_s$ of the transmitter 22. Thenceforth, the processing of obtaining the delay time $d_s$ ascribable to the transmitter 22 is similarly iterated a predetermined number of times. Further, the obtained values of the delay time $d_s$ are averaged, and the average value is finally determined as the delay time $d_s$ ascribable to the transmitter 22.

Then, the training of the radio paging system ends.

After the end of the training, the ordinary operation of the radio paging system is started.

During the ordinary operation, the supervisory controller 1213 of the central station 1 causes the coders of the coder set 1206 to send the corresponding air frames to the transmitting-station-side muldem 1209 so that the air frames may be transmitted from the line termination unit 1210 (or 1211) to the individual transmitting stations 2 at the time which is, at least, the aforementioned time TMAX before the times of the transmissions of the air frames from the transmitting stations 2, with reference to the time of the GPS-based timepiece 1802 of the central station 1 itself.

Figure 23:
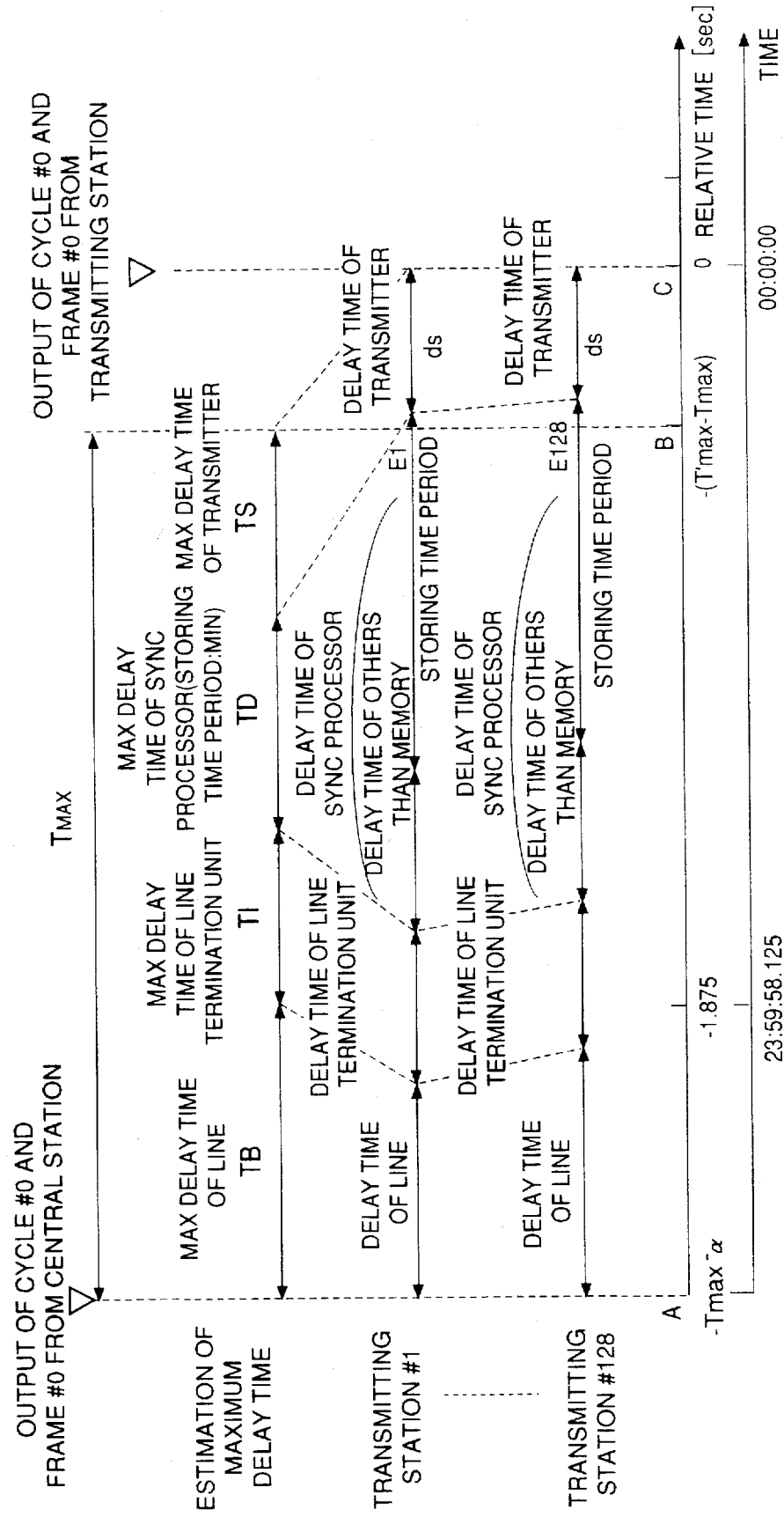
FIG. 23 is a diagram showing the situation of that transmission of the air frame which is done in the embodiment of the present invention.

On the other hand, as shown in FIG. 23, in the synchronizing module 21 of each transmitting station, the controller 1806 of the supervisory controller 2107 controls the synchronization processors 2104 so that the air frames once stored in the memories of the respective synchronization processors 2104 as stated before may be read out of the memories and sent to the corresponding transmitters 22 through the selector 2106 when the time of the GPS-based timepiece 1802 of the transmitting station 2 itself has become the time which is the delay times $d_s$ (obtained by the training) before the real times of the block information items (BI) contained in the air frames. Thus, as shown in FIG. 23, the air frames in which equivalently the identical real time is set in the block information items (BI) are transmitted from all the transmitting stations 2 at substantially the same time.

Meanwhile, the GPS satellite is under the management of the Department of Defense, U.S.A., and it is not guaranteed to accurately transmit the signal of the current time without fail. In this embodiment, therefore, failure checks to be explained below are performed, and the time is managed with reference to the time of the central station 1 replacing that of the GPS satellite, in a case where the GPS satellite has been judged to undergo any failure. Apart from the GPS satellite, the various portions and lines of the transmitting stations 2 can undergo failures. In this embodiment, therefore, failure checks and failure counterplans are performed as stated below. For these purposes, according to this embodiment, the supervisory controller 1213 of the coding module 12 of the central station 1 and that 2107 of the synchronizing module 21 of each transmitting station 2 are respectively duplexed. One of the duplexed supervisory controllers is used for normal use (N), while the other is used for emergency use (E).

The failure checks and the failure counterplans in this embodiment are performed as described below.

The controller 1701 of the supervisory controller 1213 of the central station 1 intermittently causes the coder 1206 to create an air frame in which a time is stated as message information (MF in FIG. 6). Subsequently, it causes the line termination unit 1210 (or 1211) to transmit the created air frame to the individual transmitting stations 2 at the time stated in the message information (MF), on the basis of the GPS-based timepiece 1802 of the central station 1 itself. On the other hand, each of the transmitting stations 2 (including also the genuine standard station and the standby standard station) connected to the central station 1 by the dedicated digital lines or the public digital lines detects the input timing of the air frame entering the synchronization processor, in cooperation with the set of synchronization processors 2104. Further, the synchronization processor evaluates the difference between the time of the GPS-based timepiece 1802 of the transmitting station 2 itself at the above input timing and the time stated in the message information (MF) of the air frame, and it stores the evaluated difference as the sum $d_b$ between a delay time ascribable to the line laid between the central station 1 and the transmitting station 2 itself and a delay time ascribable to the line termination unit 2101 (or 2102). The sum db, however, may well be replaced with a fixed value which is appropriately obtained.

Besides, the controller 1806 of the supervisory controller 2107 of each of the genuine and standby standard stations causes the transmitter for the transmitting stations, 1901 to transmit a test air frame in which a real time is contained in block information (BI in FIG. 6), at the real time with reference to the GPS-based timepiece 1802 of the standard station itself. Here in this embodiment, frequency bands to be used by the transmitter for the transmitting stations, 1901 of the genuine and standby standard stations laid out in the same service area are slightly shifted, and a center frequency is selected in each of the transmitting stations 2. Thus, each transmitting station 2 can selectively receive one of the signal from the genuine standard station and the signal from the standby standard station. It is also allowed, however, that the test air frames of the genuine and standby standard stations are respectively transmitted at predetermined transmission timings differing from each other, and that one of the air frame from the genuine standard station and the air frame from the standby standard station is selectively received on the basis of the different transmission timings by each of the transmitting stations 2.

On the other hand, in the supervisory controller 2107 of each transmitting station 2, the test air frame is received by the receiver for the standard station, 1805. Subsequently, the controller 1806 of the supervisory controller 2107 compares the real time contained in the block information (BI) within the received air frame, with the time of the GPS-based timepiece 1802 of the transmitting station 2 itself. In a case where the difference of the times is a predetermined value or greater, the controller 1806 judges that an event a has occurred. Further, the difference of the times is stored as the sum $d0_n$ of the delay time t0 of the radio transmission from the standard station and a delay time $d_n$ ascribable to the receiver for the standard station, 1805.

Besides, in the supervisory controller 2107 of each transmitting station 2, the air frame transmitted from the transmitting station 2 itself is received by the monitoring receiver 1804. Subsequently, the controller 1806 of the supervisory controller 2107 compares the real time contained in the block information (BI) within the received air frame, with the time of the GPS-based timepiece 1802 of the transmitting station 2 itself. In a case where the difference of the times is a predetermined value or greater, the controller 1806 judges that an event b has occurred.

In a case where only the event a of the events a and b has occurred, the controller 1806 judges that the genuine standard station has failed, and it changes-over the air frame to be received by the receiver for the standard station, 1805 to the air frame transmitted by the standby standard station. The changeover may be effected in such a way that an actuator built in the receiver for the standard station, 1805 is driven to alter the direction of the antenna (for the genuine standard station) of this receiver 1805 usually facing the genuine standard station, so as to face the standby standard station (that the directivity of the antenna of the receiver for the standard station, 1805 is changed, or that an antenna for the standby standard station as is separately mounted is used instead of the antenna for the genuine standard station), whereby the signal which is selectively received as explained before is changed-over from the signal of the genuine standard station to that of the standby standard station. If only the event a of the events a and b continues to arise in spite of the changeover, the controller 1806 judges that the receiver for the standard station, 1805 undergoes a failure, and it changes-over its own supervisory controller 2107 operating for the normal use (N), to the supervisory controller 2107 for the emergency use (E).

On the other hand, in a case where only the event b of the events a and b has occurred, the controller 1806 judges that the monitoring receiver 1804 has failed, and it changes-over its own supervisory controller 2107 operating for the normal use (N), to the supervisory controller 2107 for the emergency use (E). Besides, in a case where only the event b of the events a and b continues to arise in spite of the changeover, the controller 1806 judges that the transmitter 22 corresponding to the air frame undergoes a failure, and it executes the following processing: In the supervisory controller 2107 of each transmitting station 2, the air frames transmitted from the respective transmitters 22 of the transmitting station 2 itself are monitored by the monitoring receiver 1804. Herein, in a case where any of the air frames received from the transmitters 22 by the corresponding synchronization processors 2104 cannot be received within a predetermined time period since that transmission time of the particular air frame which is evaluated from the cycle No. and frame No. of the particular air frame and the real time contained in the block information (BI) of this air frame, the controller 1806 judges that the transmitter 22 which ought to have transmitted the particular air frame undergoes the failure. Thereafter, the controller 1806 notifies the failure of the transmitter 22 to the supervisory controller 1213 of the central station 1.

Further, in a case where the events a and b have simultaneously occurred, the controller 1806 judges that the monitoring receiver 1804 has failed, and it changes-over its own supervisory controller 2107 operating for the normal use (N), to the supervisory controller 2107 for the emergency use (E). Besides, in a case where both the events a and b continue to arise in spite of the changeover, the controller 1806 judges that the GPS satellite undergoes a failure, and it notifies the failure of the GPS satellite to the supervisory controller 1213 of the central station 1.

Meanwhile, in the supervisory controller 2107 of each transmitting station 2, the controller 1806 compares a difference time with the time of the GPS-based timepiece 1802 of the transmitting station 2 itself, the difference time being obtained in such a way that the maximum delay time TMAX explained before is subtracted from the transmission time of each air frame as is evaluated from the cycle No. and frame No. of the particular air frame received from the transmitting station 2 by the corresponding synchronization processor in the set 2104 and the real time contained in the block information (BI) of the air frame. If the time of the GPS-based timepiece 1802 is greater (later), the controller 1806 judges that an event c has occurred.

Upon the occurrence of the event c, the controller 1806 judges that the line laid between the transmitting station 2 and the central station 1, the line termination unit 2101 or 2102, or the corresponding synchronization processor in the set 2104 undergoes a failure, and it notifies the failure to the supervisory controller 1213 of the central station 1.

On the other hand, in a case where the controller 1701 of the supervisory controller 1213 of the central station 1 has received the notification of the failure of the transmitter 22 or the failure of the line, the line termination unit 2101 or 2102, or the synchronization processor in the set 2104 from the transmitting station 2, it executes predetermined failure counterplan processing in accordance with predetermined steps of procedure.

Besides, in a case where the controller 1701 of the supervisory controller 1213 of the central station 1 has received the notification of the failure of the GPS satellite from the transmitting station 2, it executes processing to be stated below.

First, the controller 1701 of the supervisory controller 1213 of the central station 1 commands each transmitting station 2 to use the line-based timepiece 1803 of the transmitting station 2 itself or the standard station-based timepiece 2204 thereof instead of the GPS-based timepiece 1802 thereof.

Thenceforth, the supervisory controller 1213 of the coding module 12 of the central station 1 causes the coders 1206 to send the corresponding air frames to the transmitting-station-side muldem 1209 so that the air frames may be transmitted from the line termination unit 1210 (or 1211) to the individual transmitting stations 2 at the time which is, at least, the maximum delay time TMAX before the times for transmitting the air frames from the transmitting stations 2, with reference to the time of the free-running timepiece 1702 replacing the GPS-based timepiece 1802. Here, the free-running timepiece 1702 keeps the time since the initialized time thereof in synchronism with that clock of predetermined frequency which is extracted from the line laid between the coding module 12 and the exchange 11. In addition, the free-running timepiece 1702 delivers a reference clock which is synchronized with the extracted clock of the predetermined frequency. On this occasion, the portions of the coding module 12 closer to the transmitting stations 2 with respect to the coders 1206 are operated by clocks which are synchronized with the reference clock delivered from the free-running timepiece 1702. Further, the supervisory controller 1213 of the central station 1 intermittently causes each of the coders 1206 to create an air frame in which a time is stated as message information (MF in FIG. 6), and it causes the line termination unit 1210 (or 1211) to transmit the created air frame to the individual transmitting stations 2 at the time stated in the message information (MF), with reference to the time of the free-running timepiece 1702.

Figure 24:
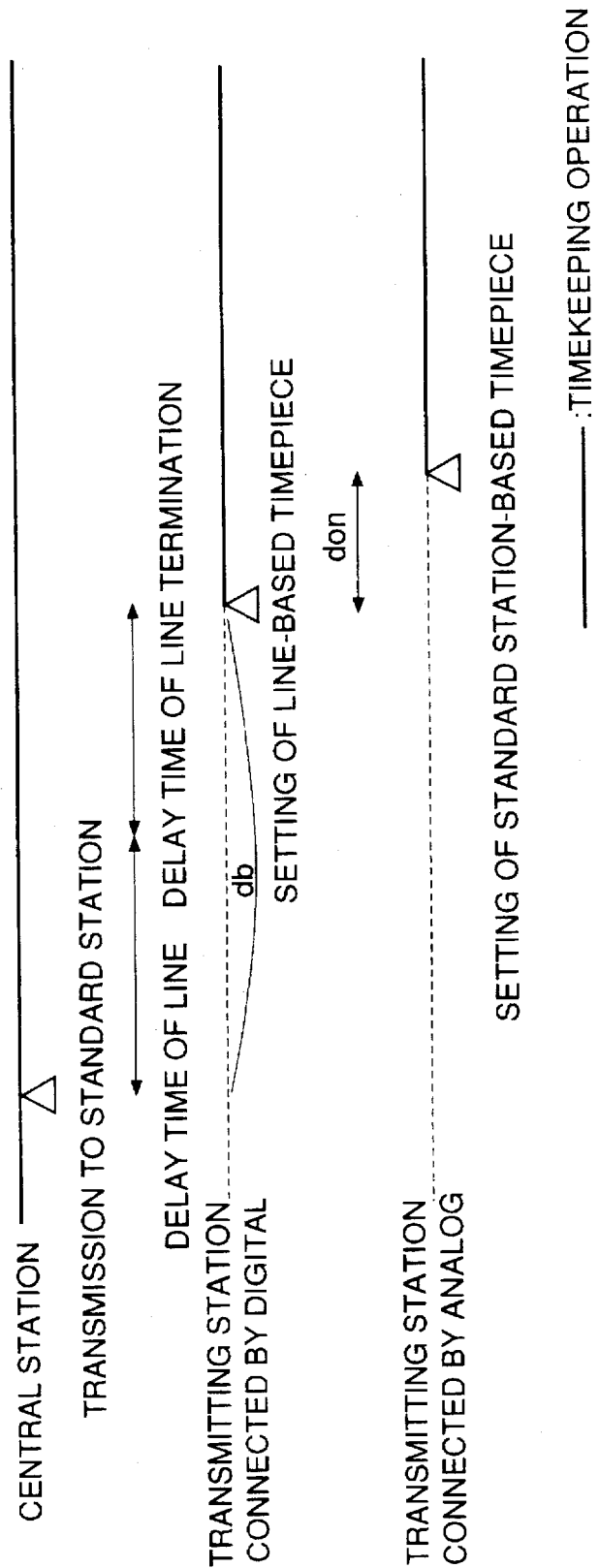
FIG. 24 is a diagram showing those evaluations of the delay times of lines and line termination units which are done in the embodiment of the present invention.
Figure 25:
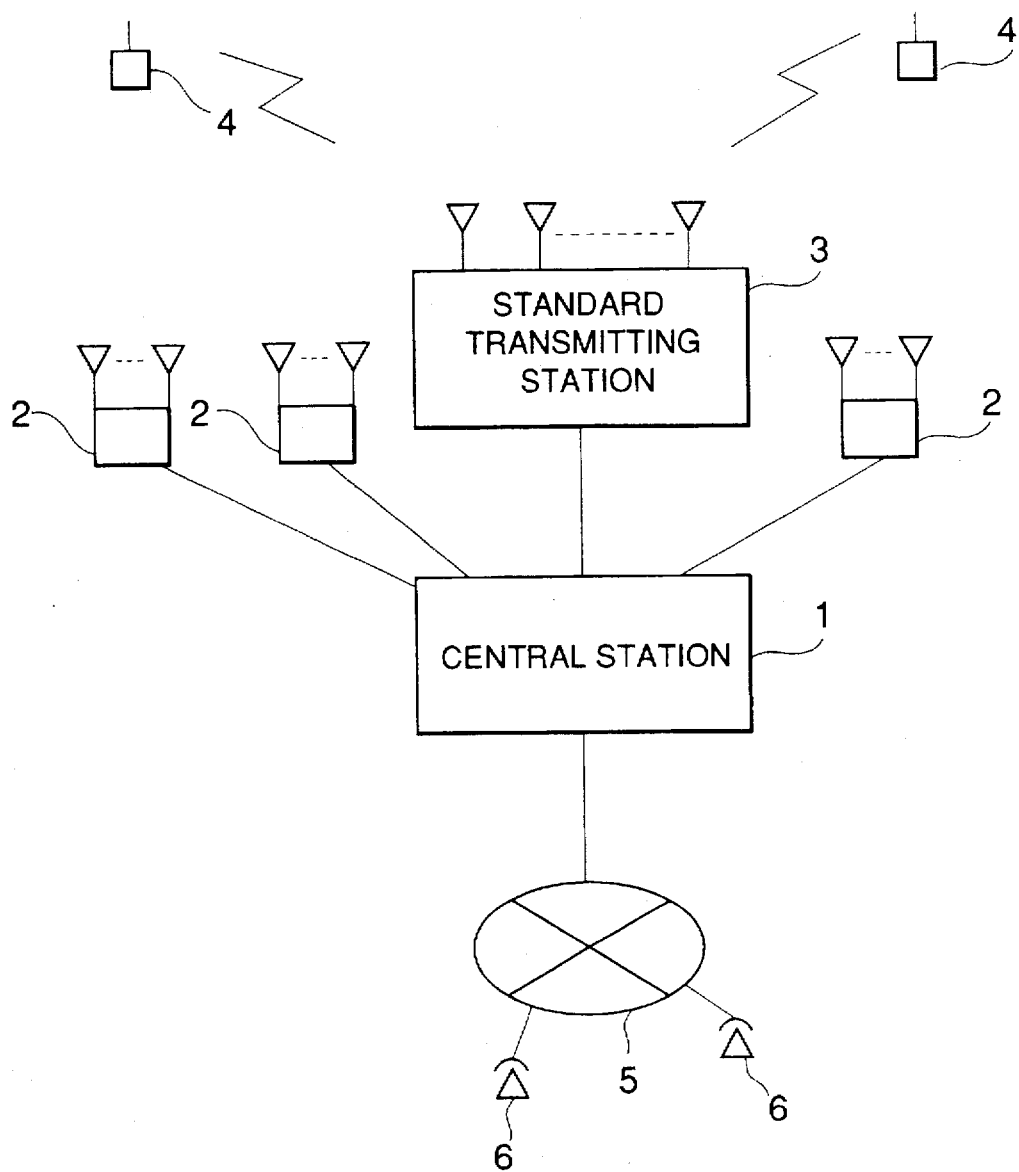
FIG. 25 is a block diagram showing the construction of a radio paging system in the prior art.

On the other hand, each of the transmitting stations 2 (including also the genuine standard station and the standby standard station) connected to the central station 1 by the dedicated digital lines or the public digital lines operates as illustrated in FIG. 24. More specifically, when the transmitting station 2 has been commanded to use the line-based timepiece 1803 by the central station 1, the supervisory controller 2107 thereof sets a specific time as the current time in the line-based timepiece 1803, the specific time being obtained in such a way that the sum db between the delay time ascribable to the line laid between the central station 1 and the transmitting station 2 itself and the delay time ascribable to the line termination unit 2101 (or 2102) as evaluated before is added to the time stated in the message information (MF) of each air frame intermittently sent from the central station 1 as explained above. When the current time has been set, the line-based timepiece 1803 keeps the time in synchronism with that clock of predetermined frequency which is extracted from the line laid between the transmitting station 2 and the central station 1. Thenceforth, the supervisory controller 2107 of each of the transmitting stations 2 (including the genuine standard station and the standby standard station), which are connected to the central station 1 by the dedicated digital lines or the public digital lines, controls the transmission time of the aforementioned air frame by the use of the line-based timepiece 1803 which replaces the GPS-based timepiece 1802.

Further, each of the genuine standard station and the standby standard station causes the transmitter for the transmitting stations, 1901 to transmit a test air frame in which a real time is contained in block information (BI in FIG. 6), at the real time with reference to the line-based timepiece 1803.

Meanwhile, each of the transmitting stations 2 connected to the central station 1 by the analog lines operates as illustrated in FIG. 24. More specifically, when the transmitting station 2 has been commanded to use the standard station-based timepiece 2204, the controller 1806 thereof sets a specific time as the current time in the standard station-based timepiece 2204, the specific time being obtained in such a way that the sum $d0_n$ between the delay time t0 of the radio transmission from the genuine standard station and the delay time $d_n$ ascribable to the receiver for the standard station, 1805 as evaluated before is added to the real time stated in the block information (BI in FIG. 6) of the air frame received from the genuine standard station by the receiver 1805. When the current time has been set, the standard station-based timepiece 2204 keeps the time in synchronism with a clock component which is contained in the air frame received by the receiver for the standard station, 1805. Thenceforth, the supervisory controller 2107 of each of the transmitting stations 2, which are connected to the central station 1 by the analog lines, controls the transmission time of the aforementioned air frame by the use of the standard station-based timepiece 2204 which replaces the GPS-based timepiece 1802.

Owing to the above operations, even when the GPS satellite has failed, the transmissions of the air frames can be accurately synchronized by the use of the delay times of the various constituent portions evaluated in the normal state of the GPS satellite, without any special setting operations in the individual transmitting stations 2.

In general, the transmitting stations 2 the number of which is larger than one hundred are connected to one central station 1. Accordingly, it is not easy to manage and control the statuses of the -individual transmitting stations 2 in each central station 1, and such connection has formed a cause for increasing the load of the central station 1.

In this embodiment, therefore, the supervisory controller 1213 of the coding module 12 of the central station 1 manages and controls the individual transmitting stations 2 in conformity with a polling method.

Now, the number of the transmitting stations 2 is assumed 128. The transmitting stations 2 are previously separated into 4 groups each consisting of 32 stations. The respective transmitting stations 2 belonging to each group are endowed with "in-group addresses" (addresses within the corresponding group). In addition, global addresses are determined as addresses common to all the transmitting stations 2. Besides, the respective transmitting stations 2 are endowed with addresses peculiar thereto.

In the actual managements and controls, the controller 1701 of the supervisory controller 1213 of the central station 1 periodically transmits frames, in each of which the global address, the in-group address or the address peculiar to the particular transmitting station 2 is bestowed on the head of a command, to all the transmitting stations 2 as supervisory control signals. On the other hand, the controller 1806 of the supervisory controller 2107 of each transmitting station 2 executes processing designated by the command, on condition that the address of the frame in the received supervisory control signal is the global address of the particular transmitting station 2 itself, the in-group address assigned to the station 2 itself, or the address peculiar to the station 2 itself. Thereafter, the controller 1806 reports the executed result of the processing to the central station 1 as a supervisory control signal along with the address which expresses the particular transmitting station 2 itself. Set as such commands are the designation of reporting the status of the transmitting station 2, the designation of changing-over the channels of the paths N1 and N2, the designation of changing-over the timepieces explained before, and so forth.

Here, the report of the executed result of the command by each transmitting station 2 may well be implemented as stated below. As thus far described, according to this embodiment, the times of the timepieces of the central station 1 and the individual transmitting stations 2 agree at a high accuracy. Therefore, time zones in which the executed results of the commands are to be reported are allotted to the respective transmitting stations 2 beforehand. The supervisory controller 2107 of each transmitting station 2 reports the executed result of the command received earlier, to the central station 1 in the allotted time zone in accordance with the time of the timepiece (the GPS-based timepiece, line-based timepiece or standard station-based timepiece) which is valid on each occasion. The supervisory controller 1213 of the central station 1 receives the executed result from each transmitting station 2 in accordance with the time of the timepiece (the GPS-based timepiece or free-running timepiece) which is valid on each occasion.

In this way, the handshaking operations between the central station 1 and the individual transmitting stations 2 are dispensed with, and hence, the load of the central station 1 is relieved. Besides, even in a case where the transmitting station 2 is not in a status capable of executing the command, the central station 1 can previously transmit the command to the transmitting station 2 before the establishment of the status capable of executing the command. Further, since the transmitting station 2 is previously informed of the time for returning the response to the command, it can make up a schedule for the execution of the command in accordance with the time. Moreover, the transmitting station 2 can execute the command while another transmitting station 2 is responding to the central station 1. These facts are useful for shortening the cycle of the polling.

Thus far, the radio paging system according to this embodiment has been described.

In the foregoing embodiment, the line-based timepiece is used in the transmitting station which is connected to the central station by the dedicated digital line or the public digital line. However, the transmitting station which is other than the genuine standard station and standby standard station may well use the standard station-based timepiece instead of the line-based timepiece, similarly to the transmitting station which is connected to the central station by the analog lines.

Also in the foregoing embodiment, the signal of the time is received from the GPS satellite. However, in a case where any other satellite transmitting the signal of the time is existent, the time signal transmitted by the satellite may well be received and utilized instead of the time signal of the GPS satellite.

As described above, the present invention can provide a radio paging system in which individual transmitting stations can be managed and controlled by a simpler technique of lower load in a central station. The present invention can also provide a radio paging system in which frames of different final transmission speeds and different information lengths can be processed by a simpler mechanism.

What is claimed is:

1. A radio paging system, comprising:

a plurality of receivers which receive messages through radio communications;

a plurality of transmitting stations which transmit the messages to said receivers through the radio communications; and a central station which is connected to a communication network, and which allocates the messages received from the communications network, to said plurality of transmitting stations, said central station including means for obtaining error correcting codes which serve to correct transmission errors of said messages received from said communications network, and means for allocating the messages to which the error correcting codes obtained are affixed, to the respective transmitting stations and for transmission of the messages via a plurality of transmission systems;

each of said receivers including means for correcting the transmission error which has developed in relation to the message received through said radio communications, by the use of the error correcting code affixed to said message;

each of said transmitting stations including means for receiving the messages from said central station by using any one of said plurality of transmission systems, and means for detecting if the transmission error has developed in relation to the message received from said central station, by the use of the error correcting code affixed to said message, and failure counterplan means for executing predetermined failure counterplan processing in which the transmission system is switched to one of the other transmission systems for reception of the messages, in a case where the transmission error rate has exceeded a predetermined value.

2. A radio paging system as defined in claim 1, wherein each of said transmission systems comprises:

at least one wire communication line which connects one of said transmitting station and said central station; and line termination units, provided at opposite ends of said wire communication line.

3. A radio paging system as defined in claim 1, wherein said error correcting codes are BCH codes.

4. A transmitting station apparatus for transmitting a message to which an error correcting code is affixed, through radio communications, in a radio paging system, comprising:

means for receiving the message to which the error correcting code is affixed from said central station by using any one of a plurality of transmission systems, means for detecting if any transmission error has developed in relation to the received message, by the use of said error correcting code affixed to said message, and failure counterplan means for executing predetermined failure counterplan processing in which the transmission system is switched to one of the other transmission systems for reception of the message, in a case where the transmission error rate has exceeded a predetermined value.

5. A radio paging system, comprising:

a plurality of receivers which receive messages through radio communications;

a plurality of transmitting stations which transmit the messages to said receivers through the radio communications; and a central station which is connected to a communications network, and which allocates the messages received from the communications network, to said plurality of transmitting stations;

said central station including means for transmitting commands for controlling the respective transmitting stations, in conformity with a polling method;

each of said transmitting stations including means for receiving the control command transmitted in conformity with the polling method, means for executing processing designated by the received control command, and means for reporting an executed result of said control command to said central station.

6. A radio paging system, comprising:

a plurality of receivers which receive messages through radio communications;

a plurality of transmitting stations which transmit the messages to said receivers through the radio communications; and a central station which is connected to a communications network, and which allocates the messages received from the communications network, to said plurality of transmitting stations;

said central station including:

means for receiving from said communications network the messages of a plurality of sorts which are to be transmitted from said transmitting stations to said receivers at different transfer rates and with different information lengths;

means for converting the information length of each of the received messages into the greatest one of the information lengths with which the plurality of sorts of messages are to be transmitted, in such a way that items of redundant information are respectively affixed to the messages of the sorts other than the messages of the sort which is to be transmitted with the greatest information length;

multiplexing means for multiplexing the plurality of sorts of messages which have the converted equal information lengths, so that each of said messages may have in a multiplexed signal the highest one of the transfer rates at which said plurality of sorts of messages are to be transmitted; and means for allocating the signal in which said plurality of messages have been multiplexed by said multiplexing means, to the respective transmitting stations;

each of said transmitting stations including means for demultiplexing each of the messages which are contained in the multiplexed signal allocated from said central station, for restoring the demultiplexed message to the message of the information length with which said message is to be transmitted, and for transmitting the restored message at the transfer rate at which said message is to be transmitted, through said radio communications.

7. A radio paging system as defined in claim 6, wherein said highest one of said transfer rates at which said plurality of sorts of messages are to be transmitted is 6.4 (kbps).

* * * * *

UNITED STATES PATENT AND TRADEMARK OFFICE
CERTIFICATE OF CORRECTION

PATENT NO. : 5,751,935
DATED : 12 May 1998
INVENTOR(S) : Takafumi KOJIMA et al.

It is certified that error appears in the above-identified patent and that said Letters Patent is hereby corrected as shown below:

| Column | Line | |
|---|---|---|
| 2 | 4 | Change "manage and control" to --manages and controls more than one hundred--. |
| 2 | 6 | Change "contains" to --containing--. |
| 9 | 40 | Delete "this embodiment," (second occurrence). |
| 9 | 61 | Change "πdenotes" to --denotes--; change "nth" to --n$th$--. |
| 10 | 10 | Change "terminations" to --termination--. |
| 14 | 66 | Change "$d_m$" to --dm--. |
| 15 | 1 | Change "$d_m$" to --dm--. |
| 15 | 3 | Change "$d_s$" to --ds--. |

UNITED STATES PATENT AND TRADEMARK OFFICE
CERTIFICATE OF CORRECTION

PATENT NO. : 5,751,935
DATED : 12 May 1998
INVENTOR(S) : Takafumi KOJIMA et al.

It is certified that error appears in the above-identified patent and that said Letters Patent is hereby corrected as shown below:

| Column | Line | |
|--------|------|---|
| 15 | 4 | Change "$d_s$" to --ds--. |
| 15 | 7 | Change "$d_s$" to --ds--. |
| 15 | 8 | Change "$d_s$" to --ds--. |
| 15 | 33 | Change "$d_s$" to --ds--. |
| 16 | 11 | Change "$d_b$" to --db--; change "between" to --*between*--. |
| 16 | 13 | Change "and" to --*and*--. |

UNITED STATES PATENT AND TRADEMARK OFFICE
CERTIFICATE OF CORRECTION

PATENT NO. : 5,751,935

DATED : 12 May 1998

INVENTOR(S) : Takafumi KOJIMA et al.

It is certified that error appears in the above-identified patent and that said Letters Patent is hereby corrected as shown below:

| Column | Line | |
|---|---|---|
| 16 | 49 | Change "$d0_n$," to --d0n--. |
| 16 | 50 | Change "$d_n$," to --dn--. |
| 19 | 26 | Change "$d0_n$," to --d0n--. |
| 19 | 28 | Change "$d_n$," to --dn--. |

Signed and Sealed this

Eleventh Day of May, 1999

Attest:

Q. TODD DICKINSON

Attesting Officer     Acting Commissioner of Patents and Trademarks